United States Patent [19]

Eddey et al.

[11] 3,863,233

[45] Jan. 28, 1975

[54] MAGNETIC MEMORY ARRAY

[75] Inventors: Everett E. Eddey, Akron; James N. Favor, Mogadore; Willard C. Meilander, Kent, all of Ohio

[73] Assignee: Goodyear Aerospace Corporation, Akron, Ohio

[22] Filed: Mar. 23, 1973

[21] Appl. No.: 344,316

Related U.S. Application Data

[63] Continuation of Ser. No. 1,495, Dec. 29, 1969, abandoned.

[52] U.S. Cl. 340/174 PW, 340/172.5, 340/174 GA, 340/174 TF, 340/174 WA

[51] Int. Cl. .......................... G11c 11/04, G11c 11/14

[58] Field of Search .............................. 340/174 PW

[56] References Cited

UNITED STATES PATENTS 3,360,788 12/1967 Casale et al. ................ 340/174 PW

OTHER PUBLICATIONS

AFIPS Conference Proceedings, (Spring Joint Computer Conference), Vol. 30, 1967, pg. 507–515.

*Primary Examiner*—James W. Moffitt
*Attorney, Agent, or Firm*—Oldham & Oldham

[57] ABSTRACT

An associative processor is provided which is a digital computer system capable of operating upon many independent sets of data at once or simultaneously. Each data set is processed sequentially, bit by bit giving an overall effect that is analogous to a large bank of serial computers all executing the same program, but on different data. Each memory word corresponds to one such serial processor. Since the available number of memory words greatly exceeds the number of data bits typically processed in parallel by a conventional sequential computer, the associative processor has a considerable speed advantage. Each word in memory has a common response store and arithmetic unit to accomplish logical operations in a parallel by word serial by bit interrogation. In essence, the processor combines an associative memory with control of the associative memory provided through essentially parallel input-output busses, and with the associative memory array incorporating arithmetic and logic circuits. These logic circuits permit parallel by word, serial by bit readout, thus incorporating an input/output capability that exceeds all prior computer techniques.

10 Claims, 17 Drawing Figures

INVENTORS
EVERETT E. EDDEY
JAMES N. FAVOR
WILLARD C. MEILANDER
BY: Oldham & Oldham
ATTORNEYS INVENTORS
EVERETT E. EDDEY
JAMES N. FAVOR
WILLARD C. MEILANDER
BY:
Oldham & Oldham
ATTORNEYS INVENTORS
EVERETT E. EDDEY
JAMES N. FAVOR
WILLARD C. MEILANDER
BY:
Oldham & Oldham
ATTORNEYS INVENTORS
EVERETT E. EDDEY
JAMES N. FAVOR
WILLARD C. MEILANDER
BY: Oldham & Oldham
ATTORNEYS INVENTORS
EVERETT E. EDDEY
JAMES N. FAVOR
WILLARD C. MEILANDER
BY: Oldham & Oldham
ATTORNEYS INVENTORS
EVERETT E. EDDEY
JAMES N. FAVOR
WILLARD C. MEILANDER
BY:
Oldham & Oldham
ATTORNEYS INVENTORS
EVERETT E. EDDEY
JAMES N. FAVOR
WILLARD C. MEILANDER
BY:
Oldham & Oldham
ATTORNEYS INVENTORS
EVERETT E. EDDEY
JAMES N. FAVOR
WILLARD C. MEILANDER
BY:
Oldham & Oldham
ATTORNEYS INVENTORS
EVERETT E. EDDEY
JAMES N. FAVOR
WILLARD C. MEILANDER
BY:
Oldham & Oldham
ATTORNEYS

MAGNETIC MEMORY ARRAY

This is continuation of patent application Ser. No. 1,495, filed Dec. 29, 1969 and now abandoned.

ASSOCIATIVE PROCESSOR

An associative processor is a stored program digital processor capable of performing common arithmetic or logical operations on all words in its associative memory simultaneously, compared with a conventional digital processor that performs one operation on only two words at one time. This parallel arithmetic capability is one of the novel features that distinguishes the stored program associative processor from the associative memory which can perform only parallel logical functions. Another novel feature of this associative processor is the capability to enter new data or read out data parallel by word, serial by bit.

A representative associative processor program might use one or more search operations to specify a particular subset of the available words by content, and then would perform a more or less complicated sequence of logical and/or arithmetic operations upon those selected words. None of the remaining unselected words is disturbed.

Therefore, the general object of the invention is to achieve a much more extensive use of an associative memory such as those shown in U.S. Pat. Nos. 3,300,760 and 3,300,761 by providing the capability of performing common arithmetic or logical operations on all words in memory simultaneously.

For a better understanding of the invention reference should be had to the accompanying drawings wherein.

Figure 6:
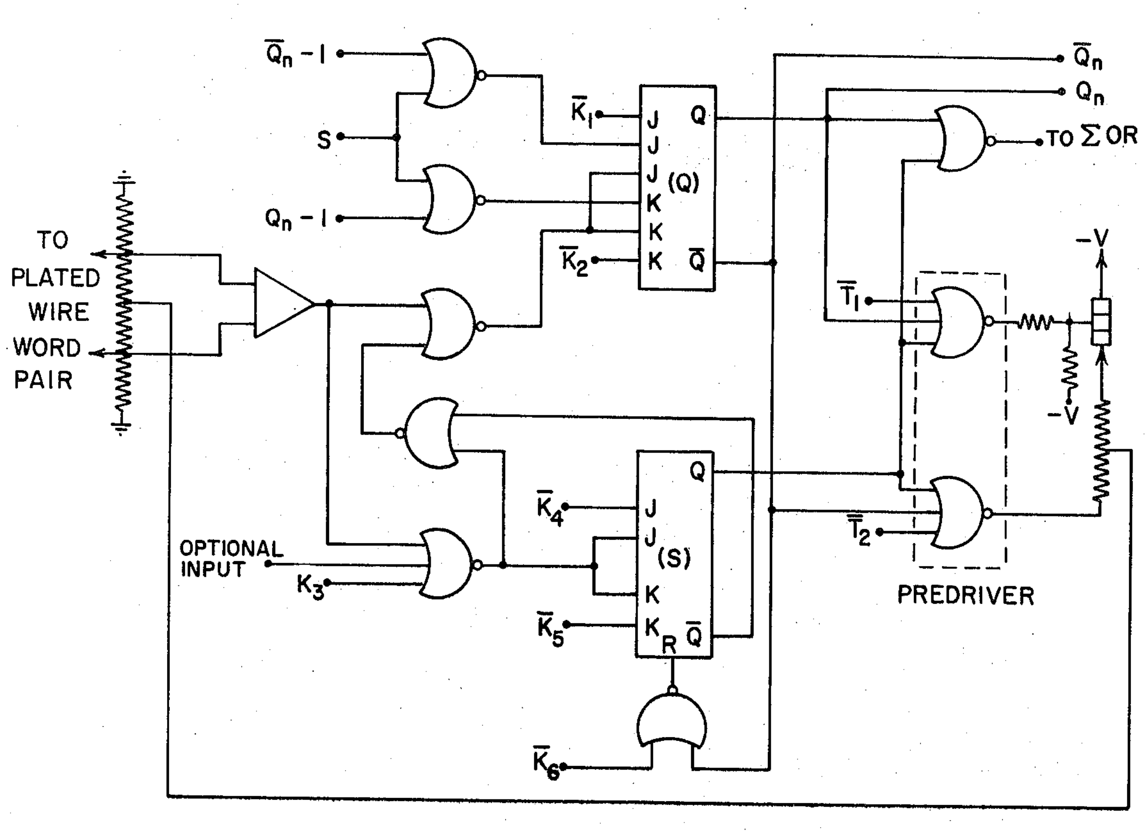
FIG. 6 is a block diagram schematic of a modified response store circuit.
Figure 6A:
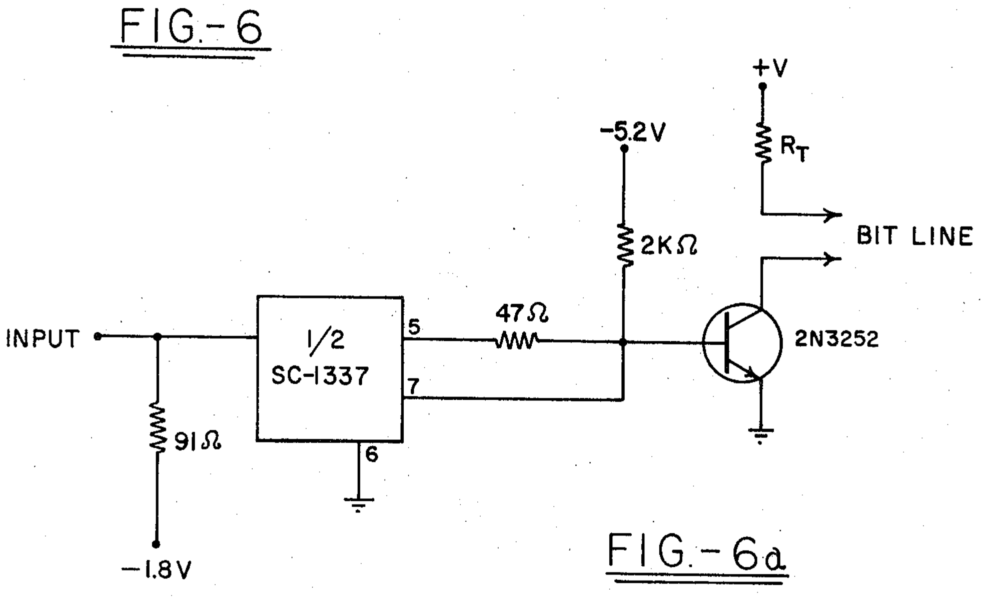
Figures 7A, 7B:
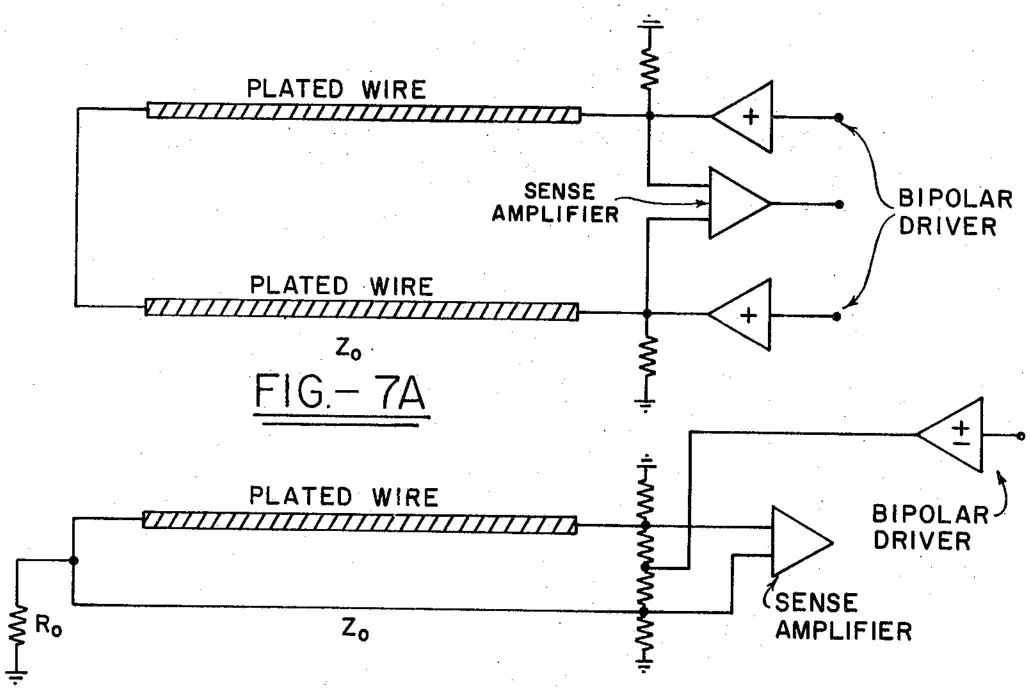

FIG. 6*a* is a schematic diagram for a bit driver;

FIG. 7*a* illustrates a word driver-sense amplifier arrangement associated with an array wherein pairs of plated wires comprise a single memory word.

FIG. 7*b* illustrates the preferred word driver-sense amplifier arrangement which may be utilized in an array wherein a single plated wire may be utilized to form a single memory word.

Figure 8:
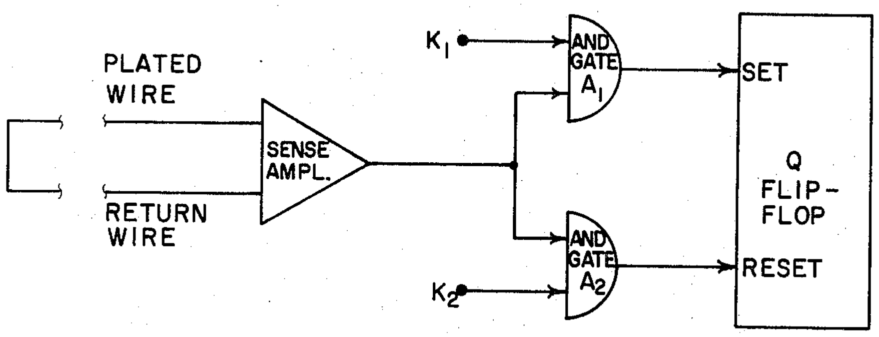
Figure 9:
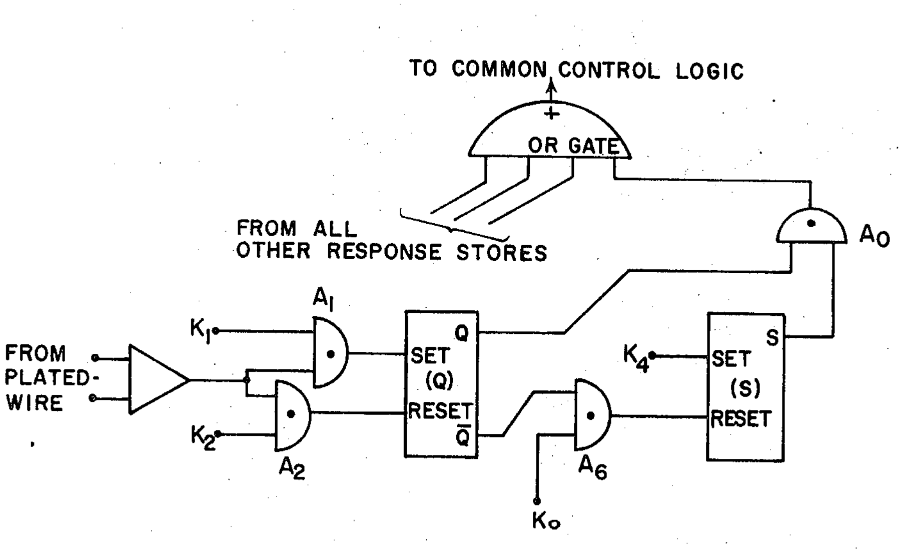
Figure 9A:
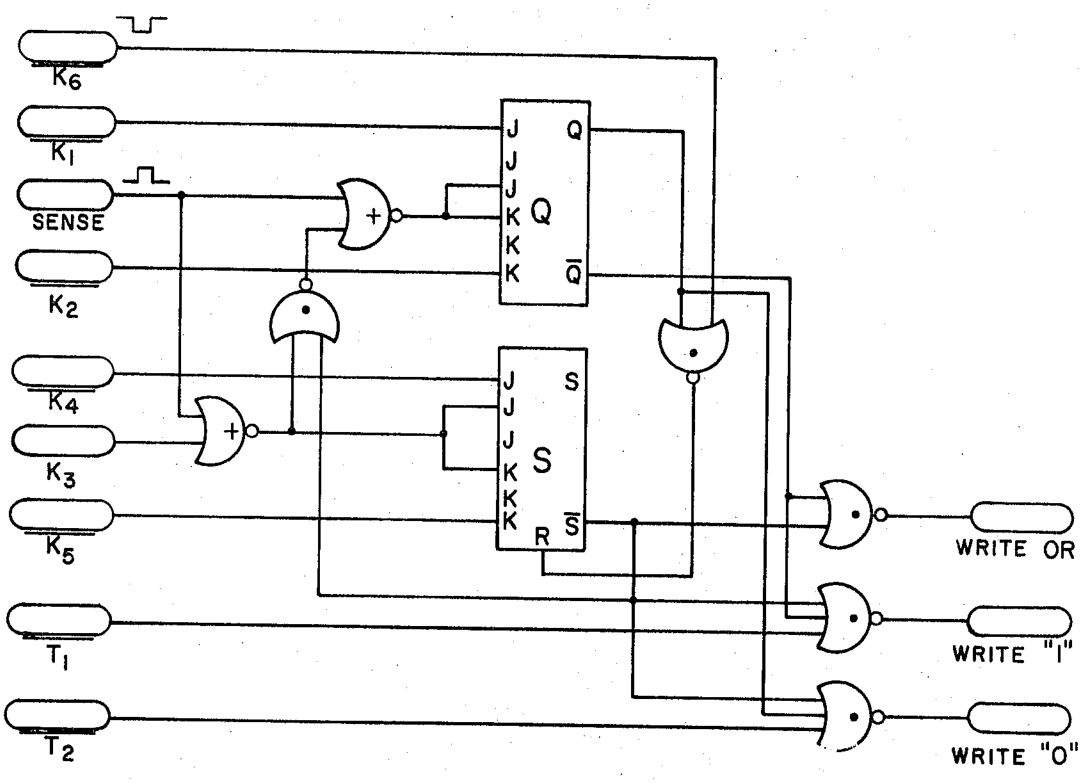
Figure 9B:
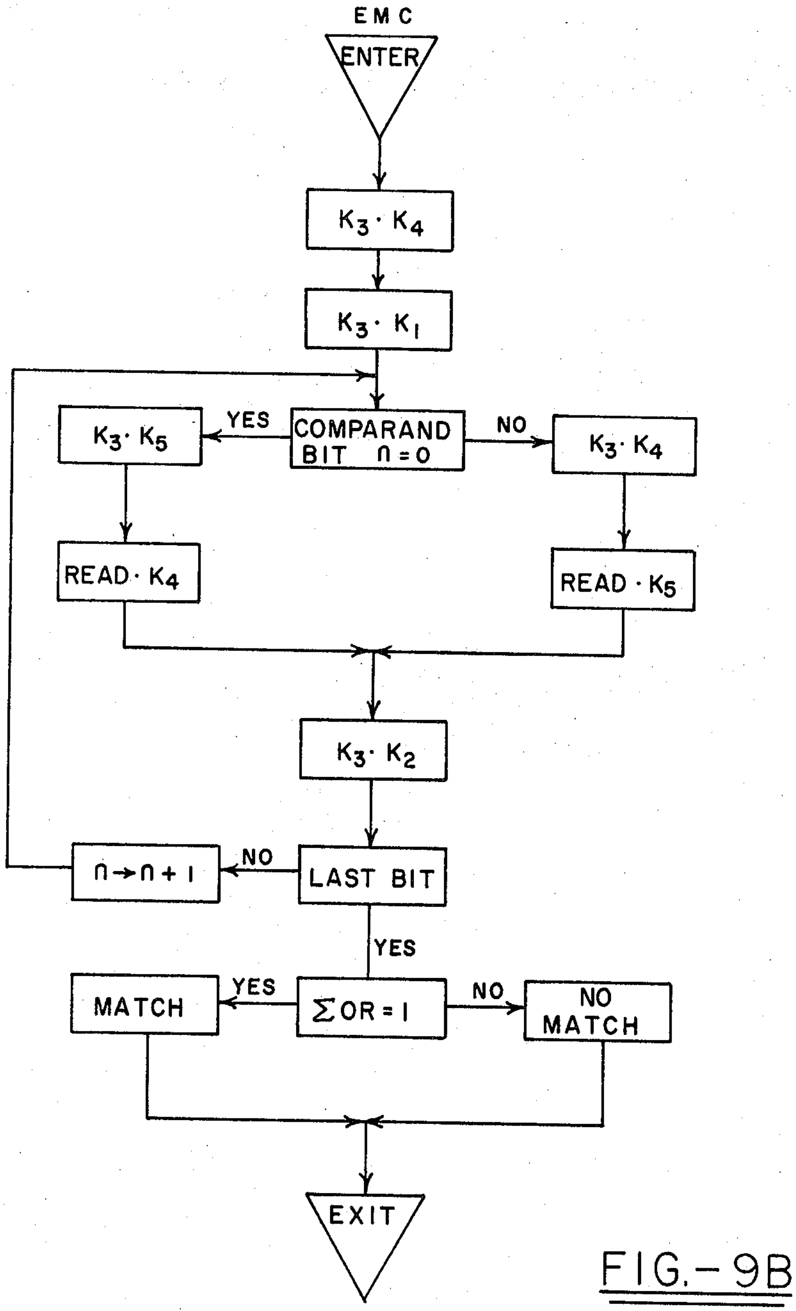
Figure 10:
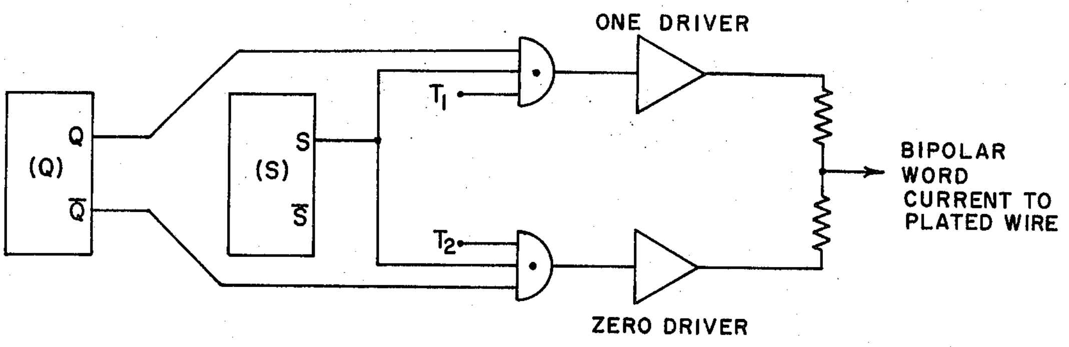
Figure 11:
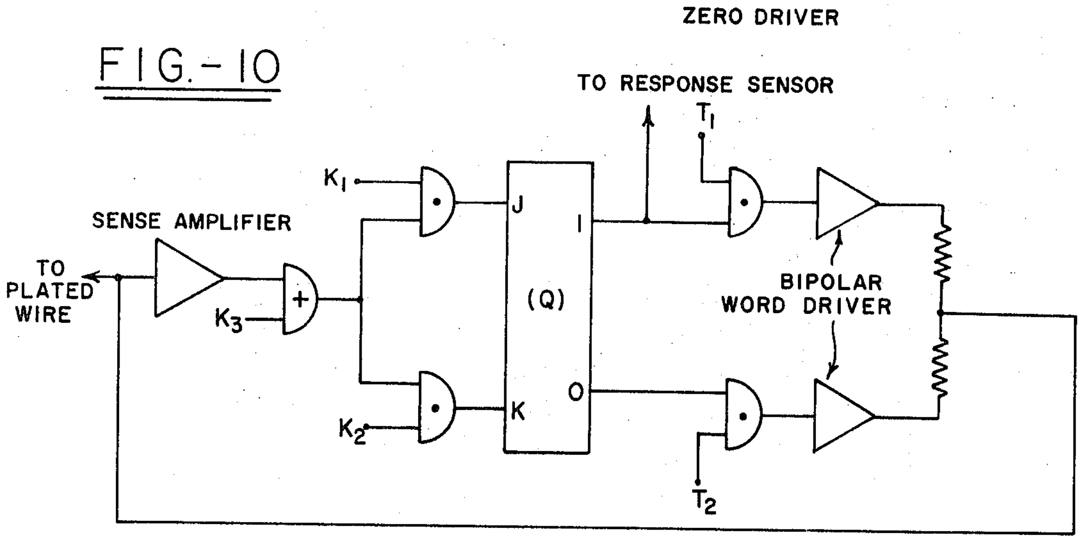
Figure 12:
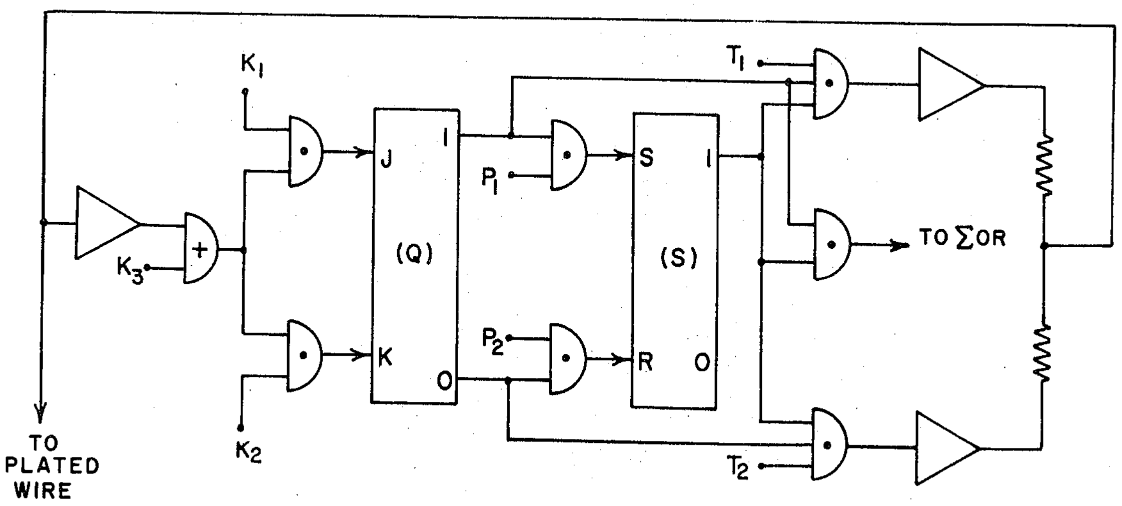

FIG. 8 is a block diagram of a phase detector logic circuit;

FIG. 9 is a block diagram of a simplified response store;

FIG. 9A is a block diagram of a typical two flip-flop response store;

FIG. 9B is an algorithm of information flow in the response store of FIG. 9A;

FIG. 10 is a block diagram of the word write driver logic;

FIG. 11 illustrates a flip-flop type response store;

FIG. 12 illustrates a minimal two flip-flop response store; and

Figure 13:
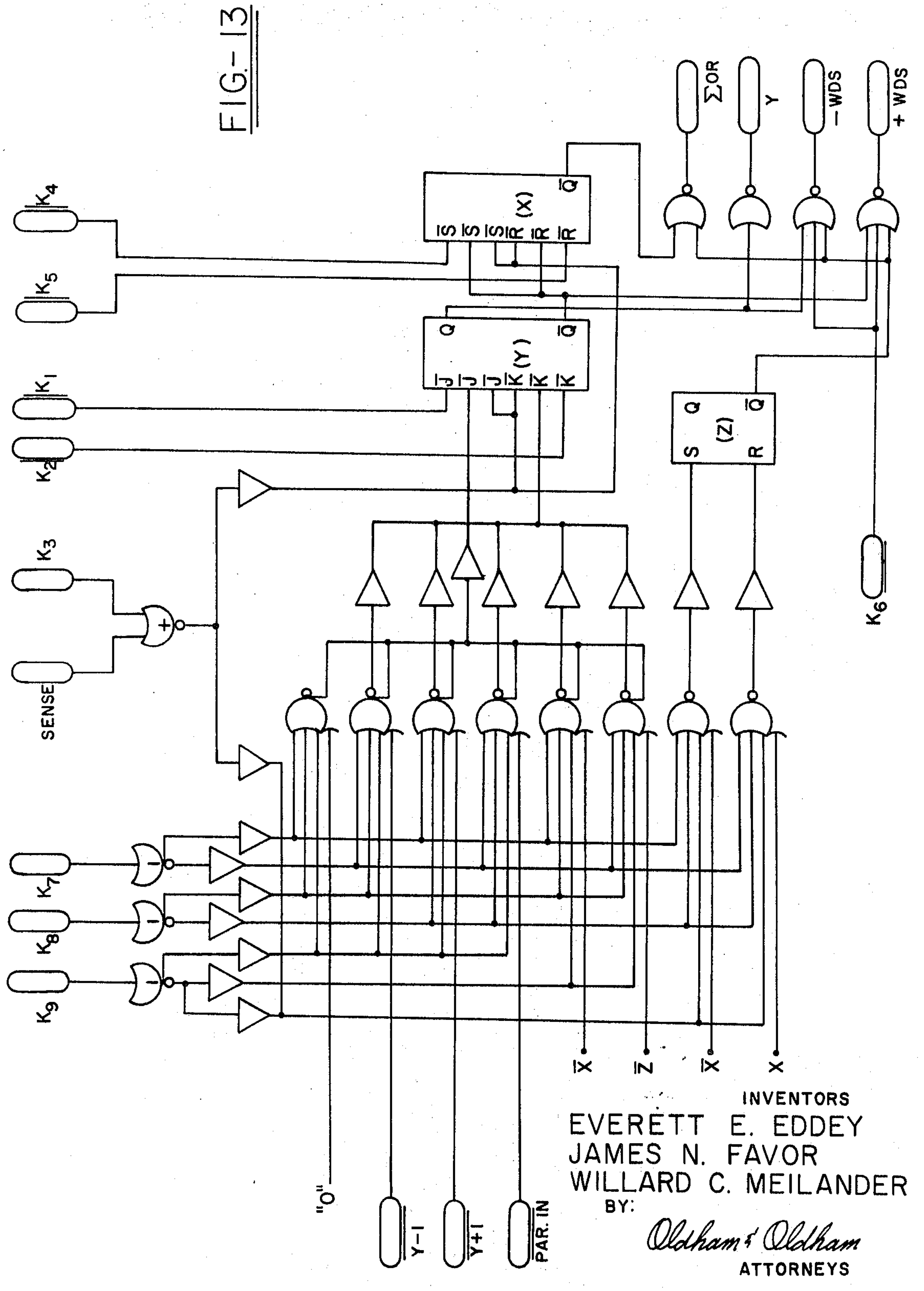

FIG. 13 illustrates a three flip-flop response store.

An associative processor is a digital computing system capable of operating on many sets of data simultaneously. It can perform parallel search operations to specify data by content and then can execute complicated sequences of logical and/or arithmetic operations upon these specified items of data. An important and necessary feature is the ability to select many such subsets of the total memory contents and to perform operations on these subsets without disturbing the contents of the unselected words.

Most associative operations are performed sequentially, bit-by-bit, upon all selected memory words at once. Since a computer typically contains many more words of storage than there are bits per word, this parallel by word, serial-by-bit mode of operation can produce a great deal more computation in a given time than the conventional parallel-by-bit, serial-by-word organization can, providing only that the application can make effective use of this parallel processing in sufficiently large sets of data.

GENERAL

Figure 1:
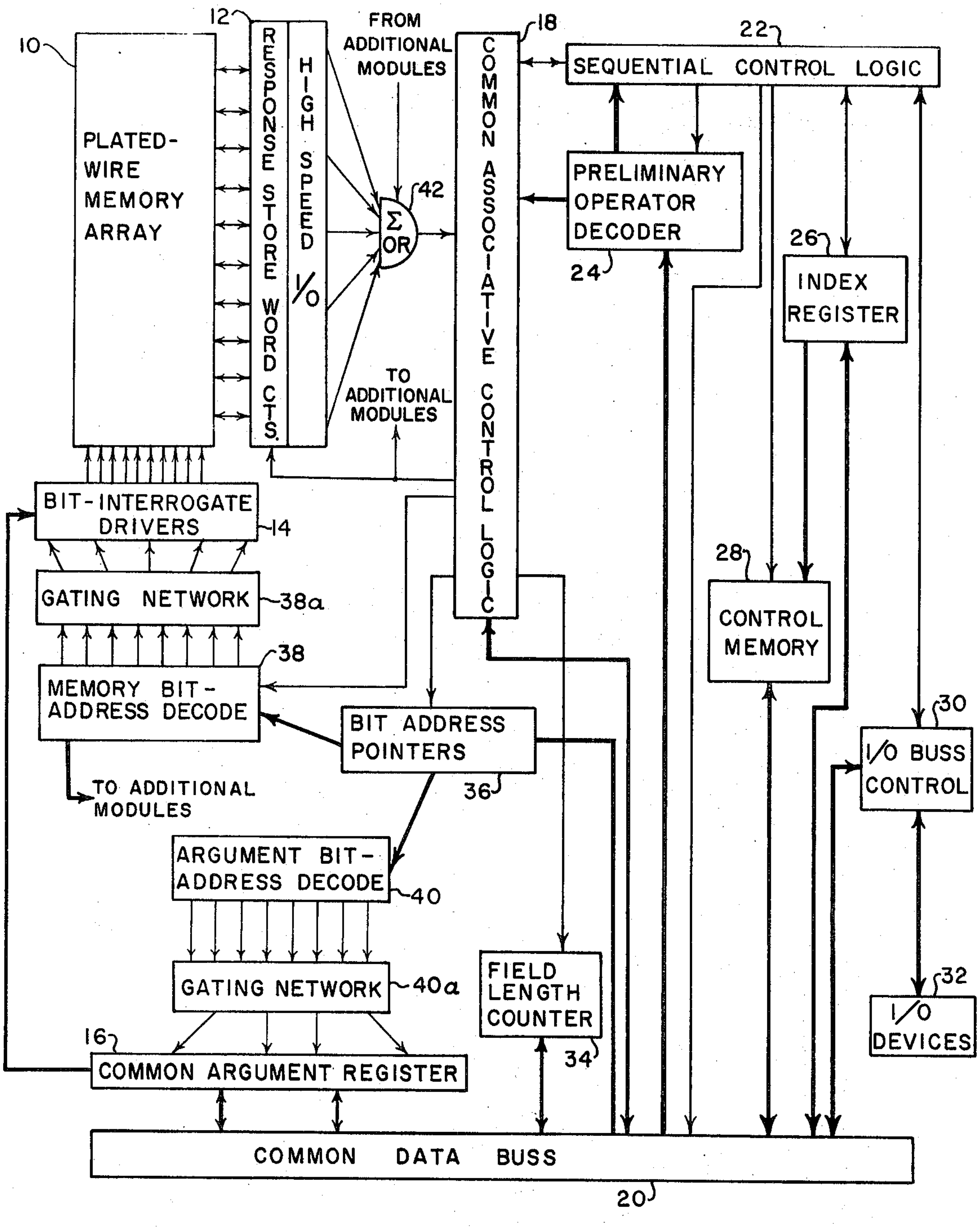
FIG. 1 is a block diagram of an embodiment of an associative processor.

FIG. 1 shows a block diagram of an associative processor. The most significant parts are a plated-wire memory array 10, response store circuits 12, bit-interrogate drivers 14, and a common argument register 16. In search operations, an input comparand word is loaded into the common argument register 16 and compared with all words in the memory array 10 simultaneously on a word-parallel, bit-serial basis. This operation is controlled by a common associative control logic section 18 using the bit-interrogate drivers 14. The results of the search appear in the response store circuits 12. The bit-interrogate drivers 14 and response store circuits 12 may be placed on the associative memory module with the memory array. This memory module is duplicated as the associative processor size increases; hence, it is the major cost element. The remaining elements shown in FIG. 1 comprise a common data buss 20, sequential control logic 22, preliminary operator decoder 24, index registers 26, control memory 28, I/O buss control 30, I/O devices 32, field length counter 34, and the bit address pointers 36 connecting to a memory bit address decoder 38, and an argument bit address decoder 40 are used for control purposes and are not duplicated in the associative processor.

PROCESSING FUNCTIONS

Associative processor functions can be organized into two general categories; associative and non-associative. All associative functions involve some action upon the associative memory array. There are three sub-categories:

1. Search operations compare an input item with the entire data base without altering the stored data. Those words that meet the prescribed search criteria (for example, exact match) are selected for use in succeeding operations.

2. Logical operations include various types of read, write, shift, and copy of selected fields and words in memory.

3. Arithmetic operations include counting, negation, addition, subtraction, multiplication, and division upon selected fields and words in memory.

The non-associative functions are concerned only with the common control logic of the associative processor, rather than with the associative array proper. These functions include such factors as instruction sequencing, manipulation of the common data registers, and input/output of single operands, which are analogous to those found in a conventional nonassociative processor.

MAJOR COMPONENTS

Figures 2, 3:
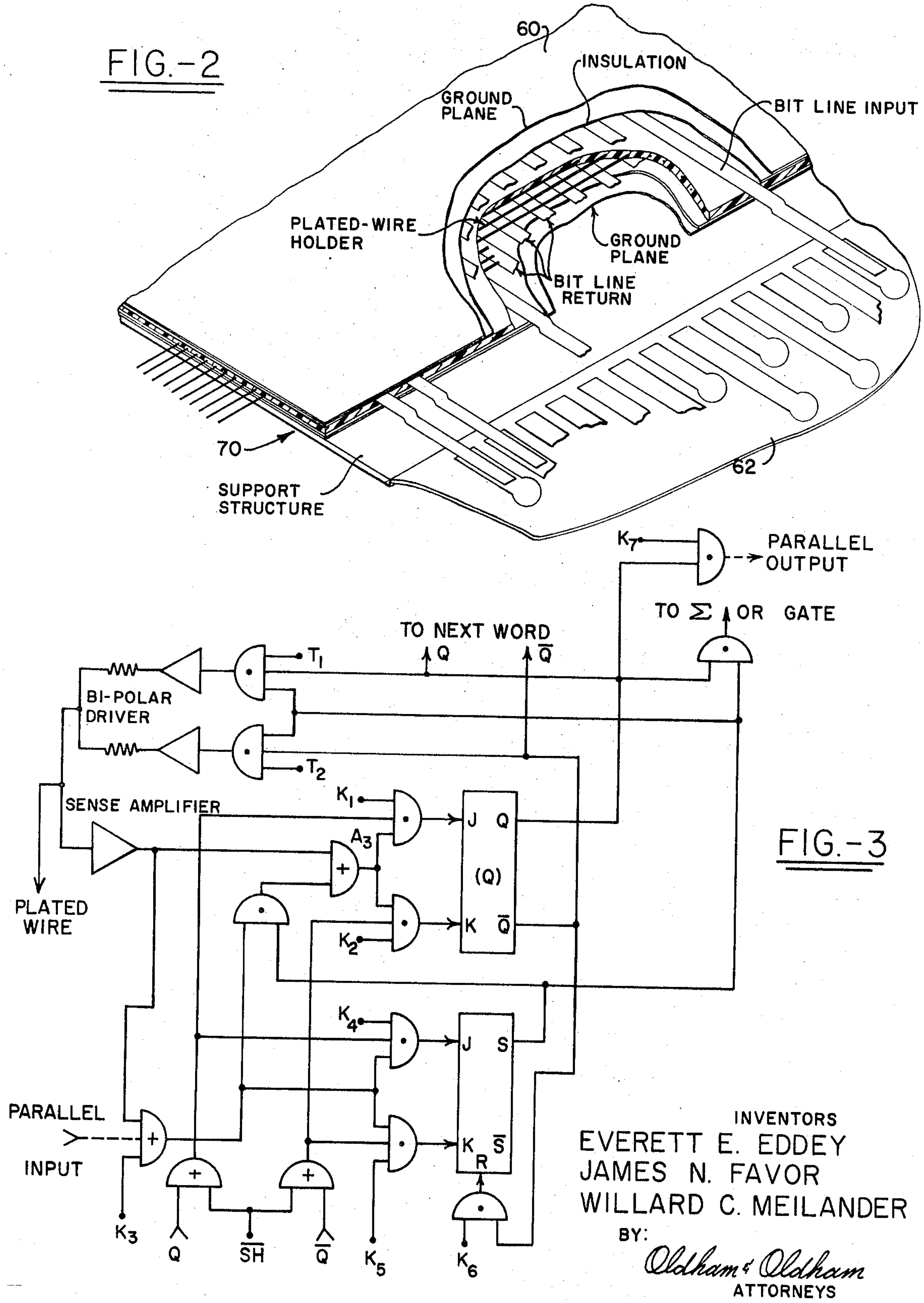
FIG. 2 is an isometric view of the structural makeup of a plated wire memory array used in the processor of FIG. 1.
FIG. 3 is a block diagram schematic of a response store circuit associated with the processor.

1. Memory Array — In the embodiment of the invention described hereinafter, each word of the memory consists of a plated wire capable of storage and nondestructive readout (NDRO). It is connected to an individual response store capable of reading out or writing data into the storage cells of the plated wire. Each cell or bit of a word is defined by its proximity to a bit-interrogate strap, which lies at right angles to the plated wire. Each bit-interrogate strap is a long, flat, solenoid, which may have one or more turns, which encloses all the word wires of a memory plane and is connected to an individual bit-interrogate driver. A complete memory plane contains any predetermined number of plated wires parallel to each other; it also preferably contains substantially the same number of bit solenoids parallel to one another in a plane parallel to the plated-wire plane and in a direction orthogonal to the plated wire. However, it should be understood that the number of bits and number of words does not necessarily have to be the same. FIG. 2, and the discussion thereof describes the plated-wire array in greater detail.

2. Bit-Interrogate Drivers — Each bit-interrogate driver produces a pulse of current whenever so directed by the control logic 18. This pulse energizes the associated bit-interrogate solenoid. The pulse magnitude is strong enough to produce a voltage pulse pair in each wire without destroying the stored data. The sense of the pulse pair depends on the polarity of the magnetic field within the bit area defined by this bit solenoid. This is the basis for reading out the contents of a stored bit position. This same bit-interrogate current, in conjunction with a smaller "tipping" current pulse in the plated wire itself, is capable of reversing the magnetic field at the intersection. This fact forms the basis for writing into a bit position. The resulting polarity of the stored bit depends only on the polarity of tipping current. Thus, the bit-interrogate pulse selects the desired bit, both for read and for write, but has no influence on the value of the stored data in either case. The interrogate driver is also further described hereinbelow.

3. Response Store — Each response store associated in circuit 12 contains a sense amplifier to amplify the voltage pulse induced in the plated wire when reading out data, a phase or gating detector, one or more flip-flops for temporary data storage, several logic gates to control the data flow, and a bipolar driver to produce the tipping current pulses used in writing data.

The pair of voltage pulses, induced in the plated wire by the leading and trailing edges of the interrogate pulses, are of opposite polarity. The difference between a stored ONE and a stored ZERO is the order in which the positive and negative pulse arrive. Since the sense amplifier preferably responds only to one polarity, its output is a single pulse, whose time of arrival (relative to the interrogate pulse) represents the stored information. Thus, a phase detector is needed to recover this information in the response store logic. The phase detector drives a flip-flop, which can be sensed by the central control logic or used to control the tipping current driver, or can be used in other logical functions within the response store. A bipolar sense amplifier may be used with a strobe pulse to sense either the leading or trailing pulse of the pulse pairs.

Control functions, plus common data, are supplied to all response stores simultaneously via the distribution or common data buss 20. An output from each response store is supplied to a Σ OR (Sigma-OR) gate 42. The output of the OR gate 42 indicates existence of one or more responses, or it can be used in reading data from a selected word. More than one Σ OR gate might be used on one plane to provide readout simultaneously from more than one selected word.

FIG. 3 is a logic diagram for a response store. K1 and K2 are the control lines for the phase detector that drives flip-flop Q; K4 and K5 control the phase detector that drives flop-flop S. The word current or tipping current drivers for write are controlled by T1 and T2. Control lines K3 and K6 generate local functions within each response store, and SH enables information in each response store to be shifted up one word to its immediate neighbor response store. A similar circuit could permit data to be shifted down.

4. Bit Address Pointers 36 — The bit address pointers 36 are provided to select a specific bit driver to be energized for each step of an operation and to allow rapid and flexible switching among several bits during an operation. Every search or other operation that refers to the memory array 10 must specify the starting location of the desired data field by means of such a bit address pointer. An operation may address the right end (or least significant bit) for some operations or the left end (most significant bit) for others. This choice is specified as a consequence of each particular instruction, which is further under program control.

Many operations require several pointers in order to specify the location of more than one operand field, either in memory or in the common argument register 16. The associative processor design preferably incorporates at least three such pointers (additional pointers can be added for very complex operations). Two decode trees 38 and 40 and gating networks **38*a* and 40*a* to couple each decode tree to a pointer also are included. The decode section 38 directly drives the bit-interrogate drivers 14 one at a time; the section 40** selects the corresponding position in the common argument register.

Closely associated with the bit-address pointers is the field-length counter 34. It is used to count the number of bits in a data field operation. When an instruction is executed, the field-length counter 34 is decremented. From an initial programmed setting, when the count goes to zero, the execution is terminated. At the same time, the bit-address pointers 36 are incremented or decremented, as required, by the individual instruction involved. Any one of the bit-address pointers can select a memory bit to be interrogated via the memory bit-address decode tree 38. Two of them also can be used to select bits in the common argument register. This concept has much flexibility because fields to be compared or combined are not required to line up, bit-for-bit, and can be specified independently of one another.

5. Common Argument Register 16 — The common argument register (CAR) normally will contain the number of bits equal to a word length in array 10. This register is references, bit-by-bit, as the source of comparand, mask, or other operands required by an bit-serial associative operation. Data readout of memory also can be copied into CAR, bit-serially.

6. Common Associative Control Logic 18 — To perform a specific useful function, the memory module with associated bit-interrogate drivers and response stores must be provided with the proper sequence of control signals. This sequence of control signals is specified by a stored program. The unit of information is a "basic step." Each basic step involves activating a specified set of control functions for a fixed length of time (nominally 50 nanoseconds). Since the basic step is too small a unit to be used by the applications programmer, conventional instructions have been defined. Each instruction is a packaged microprogram algorithm of basic operators, each of which in turn specifies the control functions during a single basic step.

These microprograms themselves are stored programs. Since each one fulfills a function frequently assumed by wired-in logic, they also can be referred to as stored logic. This approach significantly reduces control logic and provides the system programmer with a familiar and flexible means for programming the associative processor. This capability permits structuring of special subroutines by the programmer to permit change of or addition to the system algorithms.

7. Common Data Buss 20 — The common data buss provides a bit-parallel data path between all the various registers, pointers, control memory, input/output (I/O), and instruction decode logic.

8. Control Memory 28 — The control memory contains ordinary programs and microprograms, plus data to be supplied to the associative control logic section 18 or to be operated on by non-associative functions through the sequential control logic 22. The memory also can provide an I/O buffering function. The basic steps of each microprogram must come from this memory; therefore, the speed and word size must be consistent with the rate at which basic operators need be supplied to the sequential control logic section 22. The control memory might be made up of differing memory elements operating at differing speeds to provide control over the high and low speed processing steps in the associative processor.

9. Input/Output — Input/output in general will be over the common data buss 20 to the common argument register 16 for inputs and from the response store 12 for outputs. Most input/output devices will communicate via the I/O buss control 30. The I/O buss control 30 selects the proper devices, transmits and receives control signals as well as the actual data, and provides a real-time, priority interrupt system for efficient input-/output operation. Interfaces can be provided for direct operation with such mission-oriented equipment as a radar system, communication links, operator displays, and mass memories, and provide for parallel by word serial by bit transfer of data.

SPECIAL FUNCTIONS

1. Interword Communications — Our studies have shown that, for some applications such as matrix inversion, a means for simultaneous data transmission between many pairs of separate words is advantageous. The ultimate is a switching network capable of connecting any response store to any other store addressed by the data in memory. The desired result can be accomplished in a flexible, low cost network in the associative processor design by provision for shifting the contents of each response store to its neighbor.

2. Parallel Write — The logical properties of the plated-wire array permit parallel write of any or all bits in a word simultaneously. The control logic section 18 provides means for specifying any or all bit-interrogate drivers simultaneously. Three modes of parallel write operation can be provided to write the contents of the common argument register 16: (1) write bit parallel into a responding word, (2) write bit-parallel into a sequence of words starting at any given address, and (3) write bit-parallel into all responding words simultaneously.

3. Multiwrite — Multiwrite is a word-parallel write operation on any or all words simultaneously. This function provides the ability to write the contents of the response stores into a selected bit of all responding words. Two modes of multiwrite are provided: (1) write the contents of the response stores into a selected bit for all selected words simultaneously and (2) bit-serial word-parallel loading of data from or to an external source.

4. Resolve Responses — Associative operations may result in multiple responses that must be resolved. The resolving mechanism logically selects one responder from the set of responders. In this design, to resolve a set of responders, this resolve operation in conjunction with several flag operations, is performed in the following sequence:

1. Store the set of responses in a flag column
2. Perform a MAX or MIN search on the stored address field of memory in conjunction with the flag column. The fact that no two memory words have identical values in this address field is the basis on which the resolve operation can guarantee a unique response
3. Write zero in flag column of this one response
4. Perform the operations required on this one response
5. Perform a flag search (the responses obtained will be the previous set, less the one processed) and
6. If there is at least one remaining response, return to Step 2. A simple program using MODE-2 parallel write can be used to load the stored-address field after a single response store is set by controls. Since the stored-address field uniquely identified every location in memory, a word can be addressed by its physical location, as in a conventional memory, wherever required. When a third flip-flop is incorporated in the response store, the flag of steps 1 and 3 are carried out in the response store and step 5 is eliminated. Such a response store is defined hereinafter.

PLATED-WIRE ASSOCIATIVE ARRAY

Summary of Array Requirements — The array requirements are established by application studies and the associative processor organization analysis as described above. Our analysis indicate the following specifications for a typical associative array, based on the present state of the art, and the use of a processor in an aircraft control situation.

ASSOCIATIVE ARRAY
MODULE SPECIFICATIONS

TABLE I

| Item | Specification |
|---|---|
| Number of words | 256 per array |
| Word Size | 256 bits |
| Interrogate time | 100 nsec/bit |
| Multiwrite time | 300 nsec/bit |
| Parallel write time | 300 nsec/word |
| Response store and bit driver electronics | Integrated with array |

We have thoroughly analyzed various possible memory elements including plated wire, magnetic core, planar magnetic film, semiconductor arrays, and cryogenic elements. As a result of this analysis, according to the present state of the art, plated wire was selected as the preferred memory element for the associative processor. This may change, however, in accordance with future improvements in the desirable characteristics of the other memory elements with respect to speed, power, and multiwrite capability. Hence, the invention is not to be considered limited to plated wire.

In the paragraphs that follow, the term "associative array" refers to the module consisting of bit drivers, response store, and memory element matrix. It is this module that is repeated in the associative processor and is, therefore, the major cost element. The response store contains the word-oriented logic, sense amplifier, and word driver. The term "memory element matrix" refers to the ensemble of plated wires, wire holder, bit straps and mounting structure, or other appropriate means.

Figure 4:
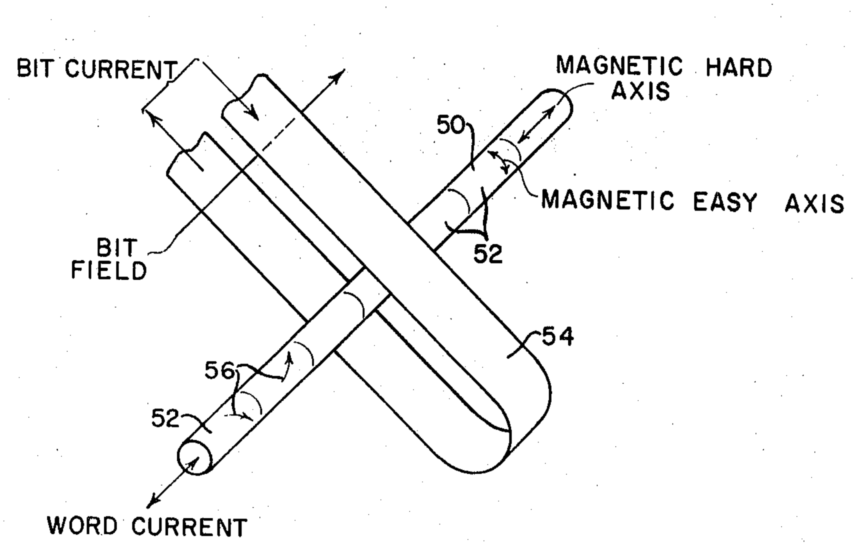
FIG. 4 is an enlarged isometric view of a plated wire and its associated bit strap.

Plated Wire as a Memory Element — Reference should be made to FIG. 4 of the drawings. The plated wire 50 is produced by electroplating an anisotropic permalloy film on a beryllium-copper wire substrate of substantially circular cross section. The invention contemplates that the wire 50 will be 0.005 inches in diameter. This is a typical size, however, and other sizes could be utilized, or even other storage means such as solid state devices for example. Bit storage locations are defined by the areas 52 common to the intersection of the plated wire and the orthogonal bit lines or straps 54. In an array, many plated wires will be intersected by each bit line 54. To write in a bit location, bit and word currents are applied at appropriate relative timing as well known in the art. When the bit current is applied, the resultant hard-axis field causes the magnetization to rotate toward the axial direction as indicated by arrow 56. A bipolar word current driver causes word current to flow either into or out of the plated wire, depending whether a "one" or a "zero" is to be written. The word current is applied so that it remains after the bit current is removed. Thus, the magnetization is steered into a clockwise (CW) or counterclockwise (CCW) circumferential direction established by the word current. To read a storage location, a current pulse is applied to the appropriate bit strap 54. The magnetization rotates reversibly through an angle less than 90°, thus causing the circumferential component to decrease in magnitude. This change induces a voltage in the plated wire 50 that is sensed at the output. Since the plated wire 50 serves as both the write line and the sense line, excellent output coupling is achieved. As long as the bit current results in a hard-axis field less than the anisotropy field, readout is nondestructive since the magnetization rotation is reversible under the influence of local anisotropies.

WIRE HOLDER

The wire holder supports the 256 plated wires and their returns in a geometrically stable and symmetrical configuration as well as contributing to a strain-free environment. Tunnel structures, comb-like guides, and grooves or slots in a mounting board or ground plane, and special-purpose cabling have been considered to meet these requirements. The wire holder selected must represent an optimum configuration in view of requirements, manufacturing capabilities, and costs.

BIT LINES

In a preferred version, the bit lines 54 consist of 256 parallel bit interrogate straps orthogonal to the plated wire and in close proximity to the wire holder and ground plane. For small-scale bench testing of selected plated wires, a typical configuration consists of 0.020 inch wide lines on 0.050 inch centers etched from one-ounce copper on 0.001 inch Mylar. The flexible bit strap assembly formed in this way is made to permit wrapping around the assembly of plated wires to make a single turn. In the 256 line versions, several approaches are possible. If a single-turn bit line is required, it could be fabricated in two sections with one-half of the turn being etched from the top layer of a multilayer board, which is the main mounting structure. The remaining half of the turn could be fabricated from flexible material for ease of assembly. It is also possible to conceive forming bit lines directly on the wire holder by a plating and etching sequence.

MOUNTING STRUCTURE

FIG. 2 shows the design for the memory element matrix. With the wire holder and the bit lines, it is necessary to mate the two in a stable geometrical relationship so that the plated wire 50 is orthogonal to the bit lines 54. This combination then is fixed to a structure containing a ground plane 60 and land areas 62 for communicating with sense and drive electronics (not shown). The mated bit and word line structures can be considered as a sandwich indicated generally by numeral 70. The ground plane 60 must be wrapped around the entire assembly of wires, and this becomes the outer layer of sandwich.

The staggered land pattern 62 shown in the plated wire direction can reasonably handle a wire density of 64 per inch, while the depth of stagger permits 0.05 inch lands 62 to be used and gives a land-to-land separation of 0.1 inch measured along the line connecting land centers. The land pattern shown in the bit line direction is an approach to accommodating a 0.05 inch bit line spacing and a single turn line with one end grounded near the driving point. The staggered patterns permit good packing densities without resorting to fanout or excessive line lengths. It should be understood, however, that this configuration represents only one of several possible mounting approaches.

ARRAY ELECTRONICS

General — Two major elements comprise the array electronics, the bit driver 14 and the response store 12. The bit driver provides the high amplitude current pulse required for the hard axis of the wires 50. The response store contains the sense amplifier, bipolar word driver, control and store logic. The essential function of the array electronics is to receive signals at the current and voltage levels of the system logic family and to store or retrieve information from the array 10 as determined by the logic signals. This is the conventional function of array electronics; however, the response store logic permits the associative memory search, multiwrite, and arithmetic functions.

The array electronics is designed as an integral part of the associative array 10. Every 256 by 256 associative array has its own set of independent bit drivers and response store elements. By fixing the size of the array, those parameters determined essentially by geometry are closely controlled. The length and spacing of the bit lines and word lines together with an optimized mounting structure permits a design to hold the inductance, capacitance, characteristic impedance, and crosstalk of the array within necessary tolerances. The close tolerances achieved simplifies the design of the array electronics.

BIT DRIVERS

The bit drivers supply the high-amplitude current required for interrogating the plated-wire memory. This bit current also writes information into memory when it occurs in conjunction with the word currents. Each bit of the plated-wire memory element matrix has its own bit driver. Thus, 256 bit drivers are required for each integrated associative array 10. Each bit driver has a similar, well-defined impedance to drive that is nearly constant for all memory interrogate and write patterns. One of the major factors in optimizing the array packaging is to minimize the requirements of the bit driver so that the complexity of the circuit design is reduced to a minimum.

A preferred implementation of the bit driver is shown in FIG. 6*a*. The SC-1337 is an integrated circuit predriver for the 2N-3252 output transistor. Resistor $R_T$ is the terminating resistor for the bit line and is on the order of 82 ohms. Although this circuit is the preferred implementation, other circuits which can supply the high-amplitude current pulses will be readily apparent to those skilled in the art.

WORD DRIVER AND SENSE AMPLIFIER

FIGS. 7A and 7B show two possible embodiments for word driver-sense amplifier configurations. The word driver must have a high input impedance during interrogate time so that it does not affect the sense amplifier or the wire, which is used as a sense line. In FIG. 7A all wires of the array are identical, plated, and connected in parts to form a single word. The bipolar driver is really two unipolar drivers, and the current direction only appears different to the wire. A strong sense signal is obtained because the different polarity in the wires add to the sense amplifier differential input. The two unipolar drivers actually take a little less circuitry and require less standby power than a single true bipolar driver. The configuration has the disadvantages that it is unbalanced while driving, injects an appreciable differential signal that may saturate the sense amplifier, and forms a mismatched transmission line. The preferred configuration is shown in FIG. 7B where only one of the wires is plated. The driver is true bipolar and maintains balanced conditions while driving. A correct match of transmission line parameters at sending and receiving ends is possible, and the sense amplifier is not driven into saturation.

COOLING

Figure 5:
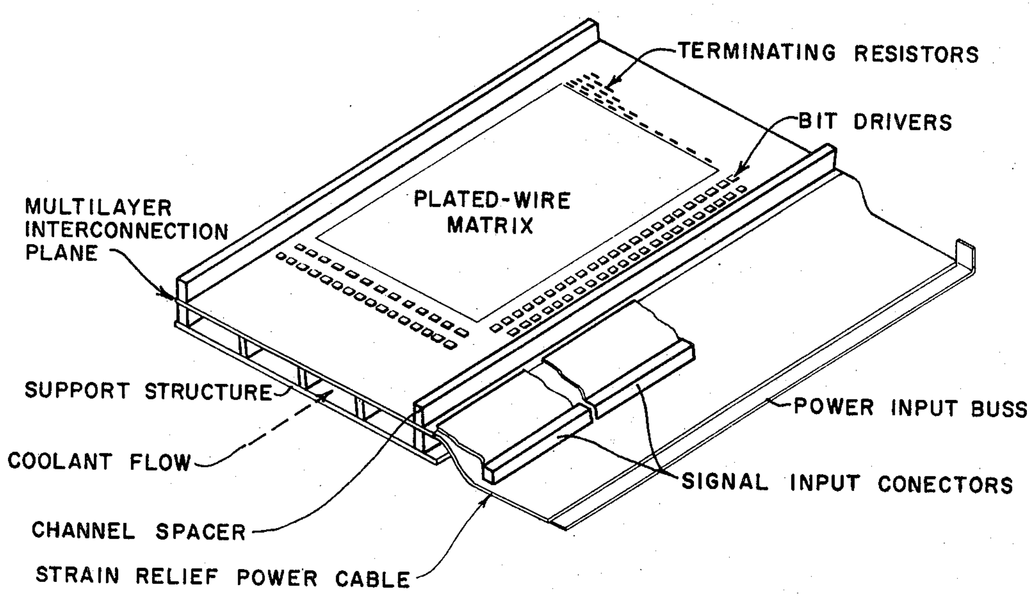
FIG. 5 is a perspective view of the memory showing the bit driver and response store structure.

The amount of power dissipation occuring in an associative processor will be high, and methods for adequate cooling are needed. FIG. 5 illustrates this structural concept. The stack is designed to accommodate an optimum cooling scheme. Adequate cooling is obtained because of the stack's compact nature and because of the planar construction of each module. The space between module planes is designed to provide an optimum channel with adequate volume free of obstruction. All connectors are located along the module edges that are parallel to the flow path. By keeping circuit boards, hardware, and cables out of the flow path, the flow and turbulence is controlled closely. Channel walls provide proper spacing to the next plane and marriage to the inlet ducting. Although considerable power is concentrated in a small area, the system's size and form factor permits more efficient heat removal than is obtainable on equivalent systems.

STRUCTURAL SUPPORT

The structural support of the module plane is designed carefully. The multilayer interconnection plane has a fairly large area and a high density of connections. Flexure and bending are thus held to a minimum so that strain is not placed on the connections or on the plated wires. The approach in FIG. 5 shows a hollow ribbed structure attached to the underside of the multilayer interconnection plane.

POWER DISTRIBUTION

During parallel write, the fast-rise current surges require a well-designed power distribution system. This is provided by using laminar buss bars having low characteristic impedance ( $< 0.5\ \Omega$ typical), storage capacitance in the vicinity of the loads, and good ground and voltage planes on the multilayer circuit boards. The mutlilayer interconnection board holding the plated-wire array and electronics have at least two ground planes; the voltage plane supplying the current for the bit drivers is sandwiched between these planes. Separate voltage planes are provided for the logic. Small low-profile, low-inductance capacitors are located at appropriate intervals along the plane to provide localized current storage for the active bit drivers. The connections bringing the power into the modules from the external supplies are designed carefully.

RESPONSE STORE OPERATION

PHASE DETECTOR AND SIMPLE SEARCH ALGORITHMS

In the phase detector circuit of FIG. 8, when a memory bit is interrogated a single amplified pulse is produced by the sense amplifier. This pulse will arrive at one of two distinct times — shortly following the leading edge of the interrogate pulse or shortly following the trailing edge of the interrogate pulse — depending on the binary value of the stored information being interrogated. For simplicity in the following discussion, these two times will be referred to as one-time and zero-time, according to this stored value, so that a sense amplifier output pulse at one-time represents a stored one, and an output at zero-time represents stored zero.

If a pulse is supplied to control line $K_1$ during one-time and the stored bit happens to be a one, then AND gate $A_1$ will generate an output pulse to set flip-flop Q to the one state. Likewise, if a pulse is supplied to control line $K_2$ during zero-time and the stored bit is a zero, then AND gate $A_2$ will generate an output pulse to reset Q to the zero state. If both control-line pulses exist during the same interrogate cycle, then the readout of the stored bit into flip-flop Q is accomplished, since there must be a sense amplifier output pulse at one of the two times, one-time or zero-time. If the times of the $K_1$ and $K_2$ pulses are reversed, Q will be the logical complement of the stored bit. Other arrangements produce results dependent on the previous state of Q as well as the value of the stored bit M. For instance, if only $K_1$ pulse at one-time is supplied, with no pulse during zero-time, then the final state of Q is the logical OR of M with the previous state of Q.

If Q is a J–K flip-flop so that simultaneous pulses from AND gates $A_1$ and $A_2$ will reverse the state of Q, then all possible combinations of pulses to $K_1$ and $K_2$ during one-time and zero-time will produce well-defined results. In fact, there are 16 such combinations; together they generate all 16 logical functions of two variables. Table II list these functions.

TABLE II

SIXTEEN LOGICAL FUNCTIONS OF TWO VARIABLES (PHASE DETECTOR LOGIC)

| One time* | | Zero time* | | Resulting function of M (memory bit) and Q flip-flop |
|---|---|---|---|---|
| $K_1$ | $K_2$ | $K_1$ | $K_2$ | Following state of Q |
| 0 | 0 | 0 | 0 | Q (no change) |
| 0 | 0 | 0 | 1 | $MQ$ |
| 0 | 0 | 1 | 0 | $\overline{M} + Q$ |
| 0 | 0 | 1 | 1 | $M \equiv Q$ |
| 0 | 1 | 0 | 0 | $\overline{M}Q$ |
| 0 | 1 | 0 | 1 | Zero (reset Q) |
| 0 | 1 | 1 | 0 | $\overline{M}$ |
| 0 | 1 | 1 | 1 | $\overline{M}\overline{Q}$ |
| 1 | 0 | 0 | 0 | $M + Q$ |
| 1 | 0 | 0 | 1 | M |
| 1 | 0 | 1 | 0 | One (set Q) |
| 1 | 0 | 1 | 1 | $M + \overline{Q}$ |
| 1 | 1 | 0 | 0 | $M \oplus Q$ |
| 1 | 1 | 0 | 1 | $M\overline{Q}$ |
| 1 | 1 | 1 | 0 | $\overline{M} + \overline{Q}$ |
| 1 | 1 | 1 | 1 | $\overline{Q}$ (complement Q) |

* 1 means a pulse is applied to this control line at this time; 0 means no pulse.

If the choice of logical function depends on the value of a comparand bit in the common data register, search operations can be performed. For example, exact match requires that MQ be used at every bit position for which the corresponding comparand bit C is a one and the $\overline{M}Q$ be used at every bit position for which C is a zero. This means that any mismatch between M and C causes Q to be reset.

TABLE III

SIMPLE SEARCH OPERATIONS

| Search description | Initialize | Logical function required Comparand=1 | Comparand=0 |
|---|---|---|---|
| Exact match or equals | One | $MQ$ | $\overline{M}Q$ |
| Mismatch or not equals | Zero | $\overline{M} + Q$ | $M + Q$ |
| Equals AND previous search | Q | $MQ$ | $\overline{M}Q$ |
| Mismatch OR previous search | Q | $\overline{M} + Q$ | $M + Q$ |
| Greater than comparand | Zero | $MQ$ | $M + Q$ |
| Less than or equal to comparand | One | $\overline{M} + Q$ | $\overline{M}Q$ |
| Less than comparand | Zero | $\overline{M} + Q$ | $\overline{M}Q$ |
| Greater or equal to comparand | One | $MQ$ | $M + Q$ |
| Subsets of comparand | One | Q | $\overline{M}Q$ |
| Non-subsets of comparand | Zero | Q | $M + Q$ |
| Supersets of comparand | One | $MQ$ | Q |
| Non-supersets of comparand | Zero | $\overline{M} + Q$ | Q |
| Intersects with comparand | Zero | $M + Q$ | Q |
| Disjoint from comparand | One | $\overline{M}Q$ | Q |
| Universal union with comparand | One | Q | $MQ$ |
| Incomplete union with comparand | Zero | Q | $\overline{M} + Q$ |

Table III lists some of the useful searches that can be implemented in this way. It also shows how Q must be initialized, if the search is not to be dependent on the previous value of Q. (The brackets group the searches into complementary pairs. Either search of any complementary pair can be obtained from the other by reversing the state of Q after it is completed.) The greater and less than searches are arithmetic in nature; therefore, the bit positions must be interrogated in a sequence starting at the least significant bit (LSB) and progressing to the most significant bit (MSB), or vice versa.

SIMPLIFIED RESPONSE STORE

In the simplified response store of FIG. 9 in inputs to Q are exactly the same phase detector as in FIG. 8. However, another flip-flop (S) plus several gates and control lines have been added. To accomplish a complete read operation, reading M (a stored bit) into the Q flip-flop is not sufficient. Means must be provided for sending this data on to the common control logic. Care must be taken to transmit only the one such Q flip-flop corresponding to the word being read out. The S flip-flop selects the word to be read out. Before performing a read, only one S flip-flop must be in the true state; all others are reset. For each memory bit interrogated, M is read into Q (see Table II). Of all the $A_0$ AND gates (one per response store), all but the selected one are inhibited by the reset condition of S. In the selected response store only, the output of $A_0$ matches the state of Q. Thus, the large OR gate (Σ OR) has only one active input, which in turn represents the value of the stored bit M in the selected word. The result is that the output of (Σ OR) carries a true copy of each bit of the selected word as they are interrogated one by one. From there, the data can be gated whenever required.

Extreme value (maximum or minimum) search is a process of elimination. Initially, a set of candidate words is selected by S. Any word whose S flip-flop becomes reset is thereby eliminated from the search. For the results to have numerical significance, interrogation must start with the most significant bit and end with the least significant bit. For each bit interrogated, the first step is to read M into Q if maximum value (MAX) is desired or $\overline{M}$ (M complement) into Q for minimum value (MIN). The output of each selected $A_0$ gate will be one only if M is one for a MAX search of M is zero for a MIN search. If the output of (ΣOR) is one, then some selected response store has such a value. This means that any selected word whose Q is zero is not so extreme in value as those whose Q is one.

A pulse to $K_6$ at this point will eliminate all such less extreme words by resetting S. On the other hand, if the output of (Σ OR) is zero, then $K_6$ must not be pulsed, since this would eliminate all words from the search. This means that any bit position for which all selected words have the same value is bypassed. After the least significant bit position has been so processed, there must be at least one selected word remaining (assuming there were some at the beginning). If there are more than one, then they all have exactly the same value in the field searched.

The selection pattern in S usually is the result of a search operation. By using $K_4$ to set S and then pulsing $K_6$, any search result can be copied from Q to S. A later search result can be AND'ed with S by just pulsing $K_6$. To guarantee a single selected word for readout, a MIN or MAX search can be performed on a field that contains a unique value in each word. The RESOLVE operation does this on a stored address field reserved for this use.

RESPONSE STORE FUNCTIONS

FIG. 9A is another embodiment of a two flip-flop response store. FIG. 9B is an algorithm of information passage in a typical manner therein. Its functions are described below:

K1 — Allows "sense" or "K3 (if S–F/F = 1)" to set Q – F/F → 1.

K2 — Allows "sense" or "K3 (If S – F/F = 1)" to reset Q – F/F → 0.

K3 — Modifies response store with K1, k2, K4, k5 and/or shift (any combination may occur).

K4 — Allows "sense" or "K3" to set S – F/F → 1.

K5 — Allows "sense" or "K3" to reset S – F/F → 0.

Sense — Modifies response store with K1, k2, k4, k5 and/or shift (any combination may occur). The "read" command produces the "sense" signal. If the memory contained a "one" for the bit address selected.

K6 — Resets S – F/F → 0 If Q – F/F = 0

EXAMPLE

1. Assume a three bit by eight word memory with eight response stores.

2. Assume the memory to contain the following information and the Q – F/F set as follows:

| Bit 1 | Bit 2 | Bit 3 | Q - F/F | |
|---|---|---|---|---|
| 0 | 0 | 0 | 1 | Word 1 |
| 0 | 0 | 1 | 1 | Word 2 |
| 0 | 1 | 0 | 1 | Word 3 |
| 0 | 1 | 1 | 1 | Word 4 |
| 1 | 0 | 1 | 1 | Word 5 |
| 1 | 0 | 0 | 1 | Word 6 |
| 1 | 1 | 0 | 1 | Word 7 |
| 1 | 1 | 1 | 1 | Word 8 |

3. Assume the comparand — Bit 1 = 1; bit 2 = 0; bit 3 = 1.

4. Interrogation of bit 1 reveals a mismatch on words 1, 2, 3 and 4, so the Q – F/F of these words are reset. Bit 2 interrogation mismatches on words 3, 4, 7 and 8. Since words 3 and 4 were already reset, no change occurs for these words. But word 7 and 8 will now have their Q – F/F also reset. Bit 3 interrogation further eliminates word 6, so that word 5 is the responder.

EXACT MATCH SEARCH

1. Initially set all response stores. (set Q – F/F → 1 – Q = Responder flip/flop).

2. On a bit by bit basis, reset responder flip/flop on mismatch. (Function of a "read" command and response store modification by operator).

| Comparand Bit n | Memory Bit n | Operator sets S –F/F to | Read sense sets S – F/F to | Operator Resets Q – F/F if S – F/F = 1 to |
|---|---|---|---|---|
| 0 | 0 | 0 | No change S=0 | No Operation |
| 0 | 1 | 0 | 1 | 0 |
| 1 | 0 | 1 | No change S–1 | 0 |
| 1 | 1 | 1 | 0 | No Operation |

WRITE FUNCTIONS

1. The S – F/F of a response store decides if its word is to be written.

2. The Q – F/F of that same response store decides if a "one" or a "zero" is to be written provided the S – F/F = 1.

3. A "write" command then writes (both T1 and T2 selected) the contents of the Q – F/F for the words selected by the S – F/F of their response stores in the bit or bits selected by the bit driver switches.

4. T1 selected only, writes only a "one" in the bit (S) selected for those words where Q – F/F = S – F/F = 1.

5. T2 selected only, writes only a "zero" in the bit (S) selected for those words where Q – F/F = O and S – F/F = 1.

THREE FLIP-FLOP RESPONSE STORE

The three-flip-flop response store (3FFRS) shown in FIG. 13 can outperform the two-flip-flop response store (2FFRS) by using its extra bit of storage in place of a tag column in memory. This has the effect of reducing the number of accesses to memory to perform a given operation. For example, the two-flip-flop response store executes four read and two write operations for each bit of an ADD FIELDS instruction. The three-flip-flop response store requires only two reads and one write for each bit of an ADD FIELDS instruction. For the ADD FIELDS instruction, the three-flip-flop response store is twice as fast as the two-flip-flop response store.

Analysis shows that the two response stores are approximately equal in speed for the simple logical searches but the three-flip-flop response store is about twice as fast for the more complex arithmetic operations.

Rather than taking this gain in speed at the micro level, reducing speed at the micro level and then using slower but lower power circuitry to implement the response store seems preferable. Also, slower read and write rates would relieve many of the constraints on the bit and word electronics, which results in further power reductions and a less expensive array module.

The following describes typical functions in the response store of FIG. 13:

1. Only ADF and SBF are shown. (Add fields and Subtract fields) To add argument, the read B is not executed. The sense instruction that follows, contains a K3 to simulate the sense and the gating to the Y and X flip-flops are conditional upon the argument bit decoded.

2. The subtract argument from field is identical as (1), above, and the subtract field from argument change procedure from B to A. Here the $Y \rightarrow \overline{Y}$ must still be executed.

3. Time $= 0.5n + 0.2$ $\mu$sec where $n$ = number of bits in the operation.

4. The field to field operations require 1 load instruction. Pointer A contains the memory bit address of field A. Pointer B contains the memory bit address of field B. Pointer C contains the memory bit address of the sum field.

5. Argument and field operations require 2 load instructions. Here pointer B contains the argument bit address.

```
ADF/

 Select  Z
 Y → 1
 Y → 0, X → 0
┌→Read A if Y = 1, X → 0
│              Sense if A = 1, Y → Y̅; if Y = 1, X → 1
│ Read B
│              Sense if B = 1, Y → Y̅; if Y = 1, X → 1
│ Write Y
└──  X → Y
 Exit
```

```
SBF/  A—B

 Select Z
 Y → 1
 X → 1
┌→Read B
│              Sense if B = 1, Y → Y̅; if B = 1·Y = 1, 2 → 0
│ Read A; Y → Y
│              Sense if A = 1, Y → Y̅; if A = 1·Y = 1, X → 1
│ Write Y
└──────  X → Y
 Exit
```

SEARCHES

1. Each simple search requires one load pointer instruction and one load argument instruction.

2. Pointer A contains the memory bit address. Pointer B contains the argument bit address. Pointer P contains the field length.

3. Time $= 0.1n + 0.25$ $\mu$sec where $n$ = number of bits in the search. (load instructions not included)

4. SFT or SFC do not need 1 above.

```
EMC/

 Y → 1
 Y → 0,  X → 1
┌→Read Aₙ if Y = 1·ARG = 1, X → 0; Y → 1
└ Sense if MEM = 1· ARG = 1̅,̅ X → 
                          0; if MEM=1, Y→0┐  JUMP
 If Y = 1·ARG = 1, X → 0 ←────────────────┘
 If X = 1, Z → 1   (EMCO)⎫
                         ⎬ (EMC)
 If X = 0, Z → 0   (EMCA)⎭
                   24e
```

Note X contains current search response
Z contains accumulative results

```
MMC/

               Y→1
               Y→0, X→0
100 ns/bit   ┌→Read Aₙ if Y=1·ARG=1, X→1; Y→1
             └─Sense if MEM=1·A̅R̅G̅=1, X→1; If MEM=1, Y→0─┐
               If Y=1·ARG=1, X→1                       ←─┘ Jump
               If X=1, Z→1    (MMCO)⎫
               If X=0, Z→0    (MMCA)⎭X→Z
```

```
LEC/

               Y→1
               Y→0, X→1 (X→0 for LTC)
100 ns/bit   ┌→Read Aₙ if Y=1·ARG=1, X→1; Y→1
             └─Sense if MEM=1·A̅R̅G̅=1, X→0; if MEM=1, Y→0
               If Y=1·ARG=1, X→1
               If X=1, Z→1    (LECO)⎫
               If X=0, Z→0    (LECA)⎭ X→Z
```

```
MAX/

               Y→1
             ┌→Read Aₙ, X→0              (X→1 for MIN)
200 ns/bit   │ Sense if MEM=1, X→1       (X→0 for MIN)
             │ Wait for Σ OR
             └─If Σ OR=1·X=0, Z→0
```

```
SFT/

 Y→1
 Read Flag, X→0
 Sense if MEM=1, X→1
 If X=1, Z→1    (SFTO)⎫
 If X=0, Z→0    (SFTA)⎭X→Z
 Time=250 ns
```

```
SFC/

 Y→1
 Read Flag, X→1
 Sense if MEM=1, X→0
 If X=1, Z→1    (SFCO)⎫
 If X=0, Z→0    (SFCA)⎭X→Z
 Time=250 ns
```

WRITE FUNCTIONS

In any usable memory, it must be possible to write data as well as read it. Writing into plated wire involves coincident currents from both bit and word directions. The bit current is supplied by the same bit interrogate driver used to interrogate stored data. The word current is supplied by a bipolar driver associated with each response store. FIG. 10 shows the write control logic and drivers. The value of any bit to be written is determined by Q, since Q selects which driver, one or zero, is to be energized. If writing into all words is not desired, S is used to select the desired words. $T_1$ and $T_2$ control lines are normally activated together, but certain logicaal functions require separating them. Each of the two AND gates controls one of the drivers. Each driver is activated only by a one input. The logic allows only one of them to be energized at one time. Their outputs are combined to produce the required bipolar word current.

The write cycle consists of five basic steps. The first two steps cause a word current in the wire in the 1 or 0 direction as determined by the response store state. The response store is complemented in the third step, and the word current is driven in the opposite direction in the last two steps. The interrogate bit driver is energized during either the first or second word current time, depending on whether it is the response store value or its complement that is to be written into the memory. The half write condition in each direction requires two steps because of the overlap between the word current and bit current required to write into plated wire.

COMPLETE RESPONSE STORE

A response store for use in the associative processor is shown in FIG. 3; applicable portions are identical to FIGS. 9 and 10, except that the inputs to flip-flop S have been expanded to include a second phase detector. Additional inputs over and above the sense amplifier have been provided for both S and Q. In Table II, the zero, one, and Q functions are so frequently required that $K_3$ control line has been provided, enabling these functions to be performed in only one basic step rather than the complete interrogate cycle of two basic steps. The AND gate $A_3$, by restricting the effect of $K_3$ on Q only to selected words, enables copying S into Q when required. The second phase detector enables full control of S without disturbing Q. The $\overline{SH}$ control line and associated gates form the interword shift feature. Normally, $\overline{SH}$ is held in the one state so that the flip-flop inputs will not be inhibited by the shift logic. For interword shifting, $\overline{SH}$ is set to zero, and the data is steered to Q or S by manipulation of $K_1$, $K_2$, $K_4$, and $K_5$. $K_3$ supplies a clocking pulse to complete the data transfer.

A relatively simple operation, which illustrates several features of the complete response store, is MOVEDATA, field to field. This can be done within each word separately, or the interword shift can be invoked to move data from each word to nearby word. If the specified destination field overlaps the specified origin field of an active word, then this operation is similar to a shift operation, and the sequence in which the bits are interrogated must be chosen to prevent writing over any bit before it has been read. Otherwise, the bit sequence is irrelevant (the rule is simple: to move a field to the right, start at the right-hand end, and vice versa).

For each bit to be moved, M(origin) is read into Q in all words. For interword moves, the contents of Q then are shifted the required number of words. A write cycle then is performed during which $T_1$ and $T_2$ are gated, which writes Q and M (destination), only in the words selected by S. Arithmetic and other logical operations follow similar patterns, but with additional logic functions performed upon each bit while it is in the response store.

TENTATIVE INSTRUCTION LIST

Tables IV annd V are a representative list of instructions that can be implemented in the associative processor. A few are simple basic operations, but most are to be microprogrammed. Others are minor modifications of the algorithms given (for example, subtract is a modified add and other such as multiply, divide, and square root are programmed iterations of stated algorithms). The whole class of non-associative operations is approximately equivalent to the instruction set of a conventional, non-associative computer and is not detailed here.

TABLE IV

REPRESENTATIVE ASSOCIATIVE INSTRUCTIONS

| Type of Instructions | Code | Definition | Time (μ sec) |
|---|---|---|---|
| Search | SET | Set response toggles | 0.1 |
| | RET | Reset response toggles | 0.1 |
| | CRT | Complement response toggles | 0.1 |
| | SRT | Shift response toggles (to next word) | 0.1 |
| | SFT | Search flag true | 0.1 |
| | SFC | Search flag complemented | 0.1 |
| Search (continued) | EMC | Exact match with comparand | 0.1n* |
| | MMC | Mismatch with comparand | 0.1n |
| | LTC | Less than comparand | 0.1n |
| | LEC | Less than or equal to comparand | 0.1n |
| | GTC | Greater than comparand | 0.1n |
| | GEC | Greater than or equal to comparand | 0.1n |
| | BLC | Between limiting comparands | 0.2n |
| | MAX | Maximum value | 0.2n |
| | MIN | Minimum value | 0.2n |
| | NLC | Next lower than comparand | 0.3n |
| | NHC | Next higher than comparand | 0.3N |
| | NTC | Nearest to comparand | 1.0n |
| | RMR | Resolve multiple response | 1.2 |
| Logical | WFR | Write flag from response | 0.3 |
| | WFO | Write flag ones | 0.3 |
| | WFZ | Write flag zeros | 0.3 |
| | WFX | Write flag exclusive OR | 0.4 |
| | WCS | Write common to selected words | 0.3 |
| | WCO | Write common ones | 0.3 |
| | WCZ | Write common zeros | 0.3 |
| | WCX | Write common exclusive OR | 0.4n |
| | MFR | Move field to right | 0.4n |
| | MFL | Move field to left | 0.4n |
| Logical (continued) | MCR | Move complement to right | 0.4n |
| | MCL | Move complement to left | 0.4n |
| | MOR | Move ones to right | 0.4n |
| | MOL | Move ones to left | 0.4n |
| | MZR | Move zeros to right | 0.4n |
| | MXR | Move exclusive OR to right | 0.5n |
| | MZL | Move zeros to left | 0.4n |
| | MXL | Move exclusive OR to left | 0.5n |
| | ROS | Read OR of selected words | 0.15n |
| | RAS | Read AND of selected words | 0.15n |
| | CMB | Count mismatched bits | $n(0.5 \log_2 n + 0.1)$ |
| Arithmetic | ISF | Increment selected field | 0.5n |
| | DSF | Decrement selected field | 0.5n |
| | NEG | Negate selected field | 0.5n |
| | RSF | Round selected field | 0.5n+0.1 |

TABLE IV – Continued

REPRESENTATIVE ASSOCIATIVE INSTRUCTIONS

| Type of Instructions | Code | Definition | Time (μ sec) |
|---|---|---|---|
| | ADC | Add common argument | 0.8n |
| | SBC | Subtract common argument | 0.8n |
| | ADF | Add memory fields | 1.6n |
| | SBF | Subtract memory fields | 1.6n |
| | MPC | Multiply by common argument | $0.8n^2 + 0.6n$ |
| | MPF | Multiply two memory fields | $1.6n^2 + 0.6n$ |
| | DVC | Divide by common argument | $0.8n^2 + 0.6n$ |
| | DVF | Divide two memory fields | $1.6n^2 + 0.6n$ |
| Arthmetic (continued) | SQT | Square root of selected field | $1.6n^2 + 0.6n$ |
| | SXP | Scale to fixed point | |
| | SFP | Scale of floating point | |
| | BCD | Convert binary to BCD | |
| | BIN | Convert BCD to binary | |
| | DAC | Decimal add common argument | |
| | DAF | Decimal add two fields | |

*In the timing figures, the symbol "n" refers to the number of bits in the pertinent data field.

TABLE V

REPRESENTATIVE NONASSOCIATIVE INSTRUCTIONS

| Type of instructions | Code | Definition |
|---|---|---|
| Sequence control | JMP | Jump to addressed location |
| | JNR | Jump if no responders |
| | MPJ | Mark place and jump |
| | DXJ | Decrement index and jump if non zero |
| | MIS | Increment memory and skip on overflow |
| | MDS | Decrement memory and skip if negative |
| | EPI | Enable priority interrupts |
| | DPI | Disable priority interrupts |
| Register manipulation | LAR | Load argument register |
| | LSC | Load size counter |
| | LFP | Load field definition pointer |
| | SAR | Store argument register |
| | SFP | Store field definition pointer |
| | ADD | Add to argument register |
| | SUB | Subtract from argument register |
| | MPY | Multiply argument register |
| | OUT | Output word |
| | INP | Input word |
| | ADP | Add to field pointer |
| | SBP | Subtract from field pointer |

Table VI gives a more detailed description of some associative instructions.

RESPONSE STORE SELECTION

Single flip-flop response stores were not used because of their inability to do complex operations (for example, compound searches and arithmetic) fast enough to lend themselves to meaningful real-time processing. FIG. 3 shows the basic two flip-flop model selected. The OR gates with the $\overline{SH}$ (shift not) input are required only to perform the shift response toggles operation. FIG. 12 shows a minimal two flip-flop response store. This response store performs compound searches as rapidly as the response store of FIG. 3 but is only half as fast with respect to arithmetic operations. The three flip-flop response store of FIG. 13 is faster than any of the two flip-flop models. The exact configuration used depends on the method chosen for implementation and packaging and slight refinement of the instruction set.

FUNCTIONAL OPERATION

General — The operating algorithms for many of the associative instructions are set forth below. These instructions are divided into three groups: (1) simple searches, (2) compound searches, and (3) arithmetic operations. The simple searches are treated in greatest

TABLE VI

DETAILED DEFINITION OF ASSOCIATIVE INSTRUCTIONS

| Type of instructions | Code | Definition | Time (μ sec) |
|---|---|---|---|
| Search | SET | Set response toggles - All response toggles are set to the ONE state | 0.1 |
| | RET | Reset response toggles - All response toggles are set to the ZERO state | 0.1 |
| | CRT | Complement response toggles - All response toggles have their values reversed | 0.1 |
| | SRT | Shift response toggles - The contents of each response toggle are shifted into the response toggle of the next word | 0.1 |
| | SFT | Search flag true - The contents of the specified flag bits in memory are copied into the corresponding response toggles | 0.1 |
| | SFF | Search flag false - The complement of the specified flag bits in memory is copied into the corresponding response toggles | 0.1 |
| | EMC | Exact match of comparand - Finds all words that contain a data field matching the comparand field in the argument register, bit for bit. The resultant is stored in the response toggle | 0.1n* |
| | MMC | Mismatch of comparand - Finds all words that contain a data field failing to match the comparand field in the | |

TABLE VI – Continued

DETAILED DEFINITION OF ASSOCIATIVE INSTRUCTIONS

| Type of instructions | Code | Definition | Time (μ sec) |
|---|---|---|---|
| | | argument register in some bit location. The resultant is stored in the response toggle | 0.1n |
| | LTC | Less than comparand - Finds all words that contain a vaule numerically less than the value in the comparand field. The resultant is stored in the response toggle | 0.1n |
| Search (continued) | LEC | Less than or equal to comparand Finds all words that contain a value numerically less than the value in the comparand field or that matches the comparand field bit by bit. The resultant is stored in the response toggle | 0.1n |
| | GTC | Greater than comparand - Finds all words that contain a value numerically greater than the value in the comparand field. The resultant is stored in the response toggle | 0.1n |
| | GEC | Greater than or equal to comparand- Finds all words that contain a value numerically greater than the value in the comparand field or that matches the comparand field bit by bit. The resultant is stored in the response toggle | 0.1n |
| | BLC | Between limiting comparands - Finds all words that contain a value numerically greater than the value of the lower limit comparand field and numerically less than the value of the upper limit comparand field. The resultant is stored in the response toggle | 0.2n |
| | MAX | Maximum value - Finds all words that contain a value numerically greater than all other values within that field. The resultant is stored in the response toggle; field pointer initially must address most significant bit | 0.2n |
| | MIN | Minimum value - Finds all words that contain a value numerically less than all other values within that field. The resultant is stored in the response toggle; field pointer initially must address most significant bit | 0.2n |
| Search (Continued) | NLC | Next lower than comparand - Finds all words that contain a value numerically less than the value in the comparand field and numerically greater than all other values so defined. The resultant is stored in the response toggle | 0.3n |
| | NHC | Next higher than comparand - Finds all words that contain a value numerically greater than the value in the comparand field and numerically less than all other values so defined. The resultant is stored in the response toggle | 0.3n |
| | NTC | Nearest to comparand - Finds the value stored in memory that is numerically closer to the value in the comparand field than all other values within that field | 1.0n |
| Arithmetic ** | ISF | Increment selected field-Algebraically adds a one to the value in each selected memory word. Each sum replaces the original contents of the memory field | 0.5n |
| | DSF | Decrement selected field-Algebraically subtracts a one from the value in each memory location. Each difference replaces the original value in memory | 0.5n |
| | NEG | Negate selected field - Generates the two's complement of the value in each memory location. Each result replaces the original value in memory | 0.5n |
| | RSF | Round selected field - If the stored bit immediately to the right of the selected field is a one, the RSF proceeds exactly as if it were ISF. Any word in which this does not occur remains unaltered | |
| Arithmetic (Continued) | ADC | Add common argument-Algebraically adds the value in the comparand field to the value in each memory location. Each sum is stored in the same memory location as the corresponding augend | 0.8n |
| | SBC | Subtract common argument - Albegra- | |

TABLE VI – Continued

DETAILED DEFINITION OF ASSOCIATIVE INSTRUCTIONS

| Type of instructions | Code | Definition | Time (μ sec) |
|---|---|---|---|
| | | ically subtracts the value in the comparand field from the value in each memory location. Each difference is stored in the same memory location as the corresponding minuend | 0.8n |
| | ADF | Add fields - Algebraically adds the values in two different fields of each memory locations. Each sum is stored in the same memory location as the corresponding augend and addend | 1.6n |
| | SBF | Subtract fields - Algebraically subtracts the values in two different fields of each memory location. Each difference is stored in the same memory location as the corresponding minuend and subtrahend | 1.6n |
| | MPC | Multiply by common argument - Multiplies the value in each memory location by the value in the comparand field. Each double length product is stored in the same memory location as the corresponding multiplicand | $0.8n^2+0.6$ |
| | MPF | Multiply fields - Multiplies the values in two different fields of each memory location. Each double-length product is stored in the same memory location as the corresponding multiplier and multiplicand | $1.6n^2+0.6n$ |
| | DVC | Divide by comparand - Divides the value in each memory location by the value in the comparand field. Each remainder and quotient is stored in the same memory location as the corresponding dividend | $0.8n^2+0.6n$ |

*In the timing figures, the symbol "n" refers to the number of bits in the pertinent data field.
**All arithmetic instructions involve carry propagation, which must proceed from least significant bit to most significant bit. Therefore, all field pointers must address the right end or least significant bit at the beginning of an insstruction, and will be left with a value that addresses the next field to the left with a value that addresses the next field to the left at the conclusion of the operation.

detail because they form the basis for many of the other instructions. The subscript used in the individual algorithms refers to the *n*th bit of a register of field; the arrow denotes those sequences of basic steps that must be repeated for each bit of the field. The K's and T's refer to those control, lines energized during a given basic step.

SIMPLE SEARCHES

General — All simple search instructions modify the setting of the response store flip-flop. None of these instructions will alter the contents of any memory word, except for certain tag bits reserved for this purpose. For those searches requiring a comparison of an element against memory, it is assumed that this element is in the comparand register (c). The simplified response store (see FIG. 11) will be used to demonstrate that algorithms for the simple searches and will show the necessity of using a two flip-flop model for efficient execution of most instructions. These same algorithms also will apply to the response store of FIG. 3.

EXACT MATCH

Table VII gives the detailed algorithm for the exact match instruction. The comparison is done bit-by-bit until all the bits in the comparand fields are covered. At the end of the search, all response stores that have

TABLE VII

ALGORITHM FOR EXACT MATCH INSTRUCTIONS

| Basic steps | Operation | Control functions on | Interrogate bit | Function performed |
|---|---|---|---|---|
| 1 | Initialization | $K_1K_3$ | . . . | 1→Q |
| →2 | Interrogate n'th bit (leading-edge interrogate pulse) | $K_2$(if $c_n$=0) | n | Any mismatch will reset Q |
| 3 | Complete interrogate (trailing-edge interrogate pulse) | $K_2$(if $c_n$=1) | . . . | Any mismatch will reset Q |

their Q's equal to 1 will have exactly matched the comparand. Program control can allow selected bits of a field to be skipped, thus giving the instruction masking capability.

MISMATCH

All response stores not set to 1 in the exact match instruction must satisfy the mismatch operation. Thus, this instruction can be performed by complementing the results of an exact match and take only one basic step time longer. Table VIII shows a second method that does not require this extra step. Either method can be programmed.

TABLE VIII

ALGORITHM FOR MISMATCH

| Basic steps | Operation | Control functions | Interrogated bit | Function performed |
|---|---|---|---|---|
| 1 | Initialization | $K_2K_3$ | . . . | 0 → Q |
| →2 | Interrrogate n'th bit | $K_1$ (if $c_n$=0) | n | Set Q for any mismatch |
| 3 | Complete interrogate | $K_1$ (if $c_n$=1) | . . . | Set Q for any mismatch |

TABLE IX

ALGORITHM FOR GREATER THAN AND GREATER THAN OR EQUAL TO SEARCHES

| Basic steps | Operation | Control functions | Interrogated bit | Function performed |
|---|---|---|---|---|
| 1 | Initialization | $K_2K_3$ | . . . | 0 → Q |
| →2 | Interrogate n'th bit | $K_1$(if $c_n$=0) | n | Set Q for greater than |
| 3 | Complete interrogate | $K_2$=$c_n$=1) | . . . | Set Q for less than |

The algorithms for these searches See Table IX are different from those in Table VII in that these searches must start with the least significant bit (LSB) and proceed toward the most significant bit (MSB). The Greater-Than search is shown. If the response store is initialized to 1, the algorithm will perform greater than or equal to.

LESS THAN AND LESS THAN OR EQUAL TO

The less than and less than or equal to searches can be performed by complementing the greater than and greater than or equal to searches. The searches also can be performed by interchanging the control lines energized as explained above.

MAXIMUM AND MINIMUM

The execution of these two instructions as described previously in less detail (page 23) must start with the MSB and proceed toward the LSB; they are examples of instructions more efficiently performed by a two flip-flop response store. A single flip-flop model must use a tag bit that has to be interrogated after each bit of the search. This per-bit penalty more than doubles the time required to execute these instructions in comparison to a two-flip-flop model that uses the second flip-flop to perform the same function as the tag bit. Table X shows the maximum search algorithm for both the one and two flip-flop model of FIG. 11 and 12 and the minimum search algorithm for the two flip-flop model using the response store of FIG. 3. The Σ OR symbol refers to the logical "OR" of all response stores; M is the contents of the interrogated memory position.

COMPOUND SEARCHES

The compound searches consist of next higher, next lower, between limits, and not between limits; each is composed of a pair of simple searches. As such, they obey the properties for simple searches in that all elements external to memory are in the comparand, and no memory word is modified except for the tag bits. For example, the next highest search consists of a greater than comparand search followed by a transfer of Q to S and a minimium search (see Table XI) for the response store of FIG. 3. The pair of simple searches to form the other compound searches are shown as follows:

Next lowest
  Less than
  Q → S
Between limits
  Greater than (lower limit in comparand)
  Q → S
  Less than (upper limit in comparand)
  Q · S → S
Not between limits
  Greater than (upper limit in comparand)
  Q → S
  Change comparand to lower limit
  Less than
  Q + S → S If these compound searches were to be performed by a single flip-flop response store, the results of the first simple search would have to be written back into a memory flag and the second basic search executed, after which the flag bit would be "AND'ed" with its results. This is one extra read and write cycle (seven basic steps) per compound instruction.

TABLE X

SEARCH ALGORITHMS COMPARING FLIP-FLOP MODELS

| Basic steps | Operation | Control functions on | Interrogated bit | Function performed |
|---|---|---|---|---|
| 1 | Initialize flag * | $K_2K_3$ | . . . | 0 → Q |
| 2,3 | Condition write * | $T_1T_2$ | . . . | Disturb balance + |
| 4 | Complement Q * | $K_1K_3$ | . . . | 1 → Q |
| 5,6 | Complete write * | $T_1T_2$ | F | 1 → F |
| 7 | Interrogate n'th bit* | . . . | n | QM → Q |

TABLE X—Continued

SEARCH ALGORITHMS COMPARING FLIP-FLOP MODELS

| Basic steps | Operation | Control functions on | Interrogated bit | Function performed |
|---|---|---|---|---|
| 8 | Complete interrogate * | $K_2$ | . . . | Q → F |
| 9A, 10 | If Σ OR-1, write F* | $T_1T_2$ | F | Q → F |
| 11 | Complement Q * | $K_1K_2K_3$ | . . . | $\bar{Q}$ → Q |
| 12, 13 | Condition write * | $T_1T_2$ | . . . | Disturb balance + |
| 9B | If Σ OR=0, interro- gate F * | $K_1$ | F | F → Q |
| 10 | Complete interrogate* | $K_2$ | . . | F → Q |
| 1 | Initialization ≠ | $K_3K_4$ | . . . | 1 → S |
| 2 | Interrogate n'th bit ≠ | $K_1$ | n | M → Q |
| 3 | Complete interrogate ≠ | $K_2$ | . . . | M → Q |
| 4 | If Σ OR-1 ≠ | $K_6$ | . . . | Resets S for all eliminated words |
| | If Σ OR-0, go to 2 ≠ | . . . | . . . | . . . |
| 1 | Initialization § | $K_3K_4$ | . . . | 1 → S |
| 2 | Interrogate n-th bit § | $K_2$ | n | M → Q |
| 3 | Complete interrogate § | $K_1$ | . . . | M → Q |
| 4 | If ρ OR = 1 § | $K_6$ | . . . | Reset S for eliminated word |
| | If Σ OR = 0, go to 2 § | . . . | . . . | . . . |

§ Minimum (two flip-flop response store)
*Maximum (one flip-flop response store)
+The distrub balance operation is a half write disturb as part of the write operation which immediately follows or precedes the actual write step.

TABLE XI-NEXT-HIGHEST SEARCH

| Basic steps | Opera- tion | Control functions on | Interrogated bit | Function performed |
|---|---|---|---|---|
| 1 | Initialization | $K_3K_4$ | . . . | 1 → S |
| 2 | Initialization | $K_2K_3$ | . . . | 0 → S |
| 3 | Interrogate n'th bit | $K_1$ (if $c_n$ = 0) | n | Set Q for greater than |
| 4 | Interrogath n'th bit | $K_2$ (if $c_n$ = 1) . . . | Reset Q for | less than |
| 5 | Transfer results to S | $K_6$ | . . . | Q → S |
| 6 | Interrogate n'th bit | $K_2$ | n | M → Q |
| 7 | Interrogate n'th bit | $K_1$ | . . . | M → Q |
| 8 | If Σ OR = 1 | $K_6$ | . . . | Reset S for eliminated word |
| | If Σ OR = 0, go to 6 | . . . | . . . | . . . |

ARITHMETIC

The last advantage to be gained by using a two flip-flop response store is in the area of arithmetic; these instructions can be significantly improved by going to a three flip-flop response store. The communication paths of the response store of FIG. 3 are particularly suited for implementation of the efficient and fast add fields and add comparand (see Tables XII and XIII).

TABLE XII

IMPLEMENTATION OF ADD FIELDS*

| Basic steps | Operation | Control functions on | Interrogated bits | Function performed |
|---|---|---|---|---|
| →1 | Read $A_n$ | $K_1$ | $A_n$ | A → Q |
| 2 | Read $A_n$ | $K_2$ | . . . | . . . |
| 3 | Exclusive OR C | $K_1K_2$ | C | A⊕C → Q |
| 4 | (skip) | . . . | . . . | . . . |
| 5 | AND (S · Q) | $K_6$ | . . . | S·Q → S |
| 6 | Read bit $B_n$ | $K_1$ | $B_n$ | B → Q |
| 7 | Read bit $B_n$ | $K_2$ | . . . | B → Q |
| 8,9 | Write bit $C_n$ + 1 | $T_1T_2$ | . . . | Q → C, if S = 1 |
| 10 | Complement | $K_1K_2K_3$ | . . . | $\bar{Q}$ → Q |
| 11,12 | Complete write | $T_1T_2$ | . . . | Disturb balance |
| 13 | Read flag into S | $K_4$ | F | F → S |
| 14 | Read flag into S | $K_5$ | . . . | F → S |
| 15,16 | Write bit $D_n$ | $T_1T_2$ | $D_n$ | Q → D |
| 17 | Complement Q | $K_1K_2K_3$ | . . . | Q → Q |
| 18,19 | Complete write | $T_1T_2$ | . . . | Disturb balance |

*Add fields: (field A + field B) → field D; F - flag bit set for words in which addition is to take place; C + carry flag bit.

TABLE XIII

IMPLEMENTATION OF ADD COMPARAND*

| Basic Steps | Operation | Control functions on | Interrogated bit | Function performed |
|---|---|---|---|---|
| 1 | Initialization | $K_2K_3$ | . . . | $0 \rightarrow Q$ |
| 2,3 | Clear carry | $T_1T_2$ | C | $0 \rightarrow C$ |
| 4 | Complement Q | $K_2K_3$ | . . . | $1 \rightarrow Q$ |
| 5,6 | Complete clear | $T_1T_2$ | . . . | Disturb Balance |
| 7 | Read bit $B_n$ | $K_1$ | $B_n$ | $B \rightarrow Q$ |
| 8 | Read bit $B_n$ | $K_2$ | . . . | $B \rightarrow Q$ |
| 9,10 | Exclusive OR $C_n$ | $K_1K_2$ | C | $B \oplus C \rightarrow Q$ |
| 11,12 | Write bit $D_n$ | $T_1T_2$ | $D_n$(if A=0) | $Q \rightarrow D$ |
| 13 | Complement | $K_1K_2K_3$ | . . . | $\bar{Q} \rightarrow Q$ |
| 14,15 | Complete write | $T_1T_2$ | $D_n$ (if A=p) | Disturb Balance |
| 16,17 | Write $C_n + 1$ | $T_2$ (if A—0) | C | Correct carry if necessary |
| 18 | Complement | $K_1K_2K_3$ | . . . | $\bar{Q} \rightarrow Q$ |
| 19,20 | Complete write | $T_1$ (if A=1) | C | Correct carry if necessary |

*Add comparand: A = field in comparand; B = field in memory word; D = field the result (or sum) will appear in; C = tag bit that will contain the carry bit; and (A + B) = D. (Comparand field A + field B) → field D.

While the pulse control has been defined as utilizing a driver pulse of predetermined width having a sharp rise and fall configuration, so that both ends of the pulse are used, it should be understood that the objects of the invention can also be achieved by having a driver pulse with only a sharp rise or fall configuration, and utilizing only the one end thereof to achieve critical timing. Such techniques are well understood by those skilled in the art. The use of either the leading or trailing edge of the pulse can in some situations require less equipment and energy, and hence be less expensive and perhaps more reliable.

Thus, it is seen that great flexibility and versatility are possible with the associative processor at great speed. In effect, the equipment will provide a great new field of problem solving capability to the computer programmer.

However, in accordance with the patent statutes, only the best known embodiment of the invention has been illustrated and described in detail, it is to be understood that the invention is not limited thereto or thereby, but that the scope of the invention is defined in the appended claims.

What is claimed is:

1. Apparatus for storing, accessing, and processing a plurality of data simultaneously within a memory array having a first set of wires wherein each wire is common to all bits of one word and a second set of wires wherein each wire is common to one bit of all words and having first and second sets of current drivers wherein each current driver of the first set is connected to a different wire of the first set of wires and each current driver of the second set is connected to a different wire of the second set of wires, the wire drivers being operative to access data storage bits of the array, comprising:

- a plurality of identical circuit means connected to the array, one such circuit means connected to each of the wires of the first set of wires for retrieving data therefrom and performing upon such data all sixteen of the logic and arithmetic functions possible between two bits of data, said circuit means including:
- sensing means, one connected to each of the wires to the first set of wires, for sensing data of the bits of the associated word;
- a gating means connected to the sensing means and having a first flip-flop receiving the outputs thereof, the gating means having a timed binary pulse applied thereto such that the binary state of the first flip-flop is indicative of the output of the sensing means and the pulse timing; and
- a second flip-flop and an output gate connected to and receiving the outputs of the first and second flip-flops, the second flip-flop controlling the passage of data from the first flip-flop through the output gate.

2. The apparatus as recited in claim 1 wherein the first set of wires comprises a plurality of plated wires and a second set of wires comprise a plurality of bit straps, the bit straps crossing over the plated wires and defining data storage bits at the resultant points of crossover.

3. The apparatus as recited in claim 1 wherein each of the plated wires has adjacent thereto a return wire and wherein pairs of adjacent wires share a common termination point at one of their ends and are common to said sensing means at the other.

4. The apparatus as recited in claim 1 wherein the second flip-flop has associated therewith two control pulses, a first control pulse operative to set the state of the second flip-flop independent of the first flip-flop and a second control pulse operative to set the state of the second flip-flop as a function of the state of the first flip-flop.

5. The apparatus as recited in claim 1 wherein the first and second flip-flops are further connected to first and second writing gates, the second flip-flop being operative to simultaneously enable both writing gates, and the first flip-flop being operative to enable one of the writing gates in a mutually exclusive manner with regard to the other writing gate.

6. The apparatus as recited in claim 1 wherein the outputs of the first flip-flop and gatedly connected to the inputs of the first and second flip-flops of another of the plurality of identical circuit means.

7. The apparatus as recited in claim 1 which includes a third flip-flop connected to the first flip-flop, the third flip-flop providing a tag bit for the circuit means.

8. Apparatus for achieving the parallel processing of a plurality of data, comprising:

a magnetic memory array having bit-comprised data storage words; and a plurality of identical circuit means, one connected to each of the data storage words and capable of performing the sixteen logic and arithmetic functions possible between two bits of data, and circuit means including:

sensing means connected to the data storage word for sensing data therefrom;

a first flip-flop gatedly connected to the sensing means for receiving data therefrom and producing an output indicative thereof;

a second flip-flop connected to the first flip-flop and an output gate for selectively passing the output of the first flip-flop through the output gate; and writing means connected to the first and second circuit means and the data storage word for writing data into the array.

9. The apparatus as recited in claim 8 which further includes a gating circuit connected to the first flip-flop of another of the identical circuit means, the gating circuit providing the capability of shifting data between the various circuit means.

10. The apparatus as recited in claim 8 wherein the writing means comprises first and second gates connected to a bi-polar driver, the second flip-flop enabling both gates simultaneously and the first flip flop enabling one of the gates in a mutually exclusive manner with respect to the other gate.

* * * * *

UNITED STATES PATENT OFFICE
CERTIFICATE OF CORRECTION

Patent No. 3863233 Dated January 28, 1975

Inventor(s) Everett E. Eddey; James N. Favor; Willard C. Meilander

It is certified that error appears in the above-identified patent and that said Letters Patent are hereby corrected as shown below:

Column 3, line 61 "pulse" should read --pulses--

Column 4, line 21 "and SH enables" should read --and $\overline{SH}$ enables--

Column 13, line 42 "Kl, k2, K4, k5 should read --Kl, K2, K4, K5--

Column 13, line 46 "Kl, k2, k4, k5 should read --Kl, K2, K4, K5--

Column 15, line 42 "Sense if B = $\underline{1}$, Y → $\overline{Y}$; if B = 1· Y = 1, 2 → 0" should read "Sense if B =1; Y → $\overline{Y}$; if B = 1· Y = 1, X → 0--

Column 15, lines 42 through 45 shows " → Read B
Read A
Write Y
X → Y should read: -- 500 ns/bit → Read B
Read A
Write Y
X → Y --

Column 15, lines 62 and 63 shows: " → Read $A_n$
Sense"

should read -- 100 ns/bit → Read $A_n$
Sense --

UNITED STATES PATENT OFFICE

CERTIFICATE OF CORRECTION

Patent No. 3863233 Dated January 28, 1975

Inventor(s) Everett E. Eddey; James N. Favor; Willard C. Meilander

It is certified that error appears in the above-identified patent and that said Letters Patent are hereby corrected as shown below:

Column 16, line 54, "logicaal" should read --logical--

Column 17 and 18 under Table IV, line 17 of the table shows "0.3N" should read --0.3n--

Column 24, line 40, "fields" should read --field--

Column 27, under Table X (continued) in the third section of the table it shows "If ρ OR=1 $", it should read --If ≥ OR=1 § --

Column 27, under Table XI, under Basic Step 4, under "Interrogated bit" it shows "Reset Q for" but should show -- . . . -- and "Reset Q for less than" should be under "Function Performed"

Column 30, line 61, "flip-flop and gatedly" should read --flip-flop are gatedly--

Signed and sealed this 1st day of July 1975.

(SEAL)
Attest:

RUTH C. MASON
Attesting Officer

C. MARSHALL DANN
Commissioner of Patents
and Trademarks